US012749219B2

(12) United States Patent
Takeuchi et al.

(10) Patent No.: US 12,749,219 B2
(45) Date of Patent: Sep. 29, 2026

(54) IMAGE PROCESSING SYSTEM FOR PERFORMING MULTI-STAGE SEARCH PROCESS, PROCESSING METHOD, AND NON-TRANSITORY STORAGE MEDIUM

(71) Applicant: NEC Corporation, Tokyo (JP)

(72) Inventors: Hiroaki Takeuchi, Tokyo (JP); Ryo Kawai, Tokyo (JP); Noboru Yoshida, Tokyo (JP); Jianquan Liu, Tokyo (JP); Yuta Namiki, Tokyo (JP); Naoki Shindou, Tokyo (JP); Youhei Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 537 days.

(21) Appl. No.: 18/200,870

(22) Filed: May 23, 2023

(65) Prior Publication Data

US 2023/0410361 A1 Dec. 21, 2023

(30) Foreign Application Priority Data

May 31, 2022 (JP) ................................ 2022-088420

(51) Int. Cl.
*G06T 7/73* (2017.01)
*G06V 10/74* (2022.01)
(Continued)

(52) U.S. Cl.
CPC .............. *G06T 7/74* (2017.01); *G06V 10/761* (2022.01); *G06V 10/776* (2022.01);
(Continued)

(58) Field of Classification Search
CPC ...... G06V 10/761; G06V 10/44; G06V 40/10; G06V 40/103; G06V 40/168;
(Continued)

(56) References Cited

U.S. PATENT DOCUMENTS

2015/0370833 A1* 12/2015 Fey ....................... G06F 16/532 707/767
2022/0138249 A1* 5/2022 Xie ......................... G06F 16/56 707/737

FOREIGN PATENT DOCUMENTS

JP 2021-060736 A 4/2021
WO WO-2021084677 A1 * 5/2021 ............. G06V 40/23
WO 2021/224994 A1 11/2021
(Continued)

OTHER PUBLICATIONS

Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, p. 7291-7299.
(Continued)

*Primary Examiner* — Sumati Lefkowitz
*Assistant Examiner* — Connor L Hansen
(74) *Attorney, Agent, or Firm* — Sughrue Mion, PLLC

(57) ABSTRACT

To achieve faster search processing in the search processing of a similar image, based on a feature value of each of a plurality of keypoints of a human body included in an image, the present invention provides an image processing system 10 including: a target image acquisition unit 11 that acquires a target image; a skeleton structure detection unit 12 that performs processing of detecting a keypoint of a human body included in the target image; a first verification unit 13 that extracts a first reference image whose relationship with the target image satisfies a first extraction condition, from among a plurality of reference images, based on the detected keypoint; and a second verification unit 14 that extracts a second reference image whose relationship with the target image satisfies a second extraction condition, from among the first reference images, based on the detected keypoint.

13 Claims, 22 Drawing Sheets

(51) Int. Cl.
*G06V 10/776* (2022.01)
*G06V 10/94* (2022.01)
*G06V 40/10* (2022.01)

(52) U.S. Cl.
CPC ............ *G06V 10/945* (2022.01); *G06V 10/95* (2022.01); *G06V 40/10* (2022.01); *G06T 2200/24* (2013.01); *G06T 2207/20092* (2013.01); *G06T 2207/30196* (2013.01)

(58) Field of Classification Search
CPC .... G06V 40/171; G06V 40/23; G06V 40/107; G06T 7/74; G06T 7/33; G06T 7/248; G06T 2207/20092; G06T 7/001; G06T 7/136; G06T 7/246; G06T 7/73; G06T 2207/30196; G06T 2207/30201; G06T 7/70; G06F 18/22
See application file for complete search history.

(56) References Cited

FOREIGN PATENT DOCUMENTS

| | | |
|---|---|---|
| WO | 2022/003854 A1 | 1/2022 |
| WO | 2022/009327 A1 | 1/2022 |

OTHER PUBLICATIONS

JP Office Action for JP Application No. 2022-088420, mailed on Jan. 6, 2026 with English Translation.
Noboru Yoshida et al., "Video retrieval based on the similarity of human poses", IEICE Technical Report, Japan, IEICE, Oct. 2, 2020, vol. 120, No. 187, pp. 32-37.
Noboru Yoshida et al., "View-invariant Feature using Pose Information and Flexible Matching Algorithm for Action Retrieval", 2021 Asia-Pacific Signal and Information Processing Association Annual Summit and Conference (APSIPA ASC), USA, IEEE, Dec. 14, 2021, pp. 1556-1562.

* cited by examiner

FIG. 11

REFERENCE IMAGE INFORMATION

| REFERENCE IMAGE IDENTIFICATION INFORMATION | DATA NAME | FEATURE VALUE | . . . . |
| --- | --- | --- | --- |
| M00001 | WHEELCHAIR/ BIRD'S-EYE VIEW | *** | . . . . |
| M00002 | WHEELCHAIR/ BIRD'S-EYE VIEW | *** | . . . . |
| M00003 | WHEELCHAIR/BIRD'S-EYE VIEW, CELLULAR PHONE/RIGHT HAND/BIRD'S-EYE VIEW | *** | . . . . |
| : | : | : | |

IMAGE PROCESSING SYSTEM FOR PERFORMING MULTI-STAGE SEARCH PROCESS, PROCESSING METHOD, AND NON-TRANSITORY STORAGE MEDIUM

This application is based upon and claims the benefit of priority from Japanese patent application No. 2022-88420, filed on May 31, 2022, the disclosure of which is incorporated herein in its entirety by reference.

TECHNICAL FIELD

The present invention relates to an image processing system, an apparatus, a processing method, and a program.

BACKGROUND ART

A technique related to the present invention is disclosed in Patent Documents 1 to 3 and Non-Patent Document 1.

Patent Document 1 (International Patent Publication No. WO2021/084677) discloses a technique for computing a feature value of each of a plurality of keypoints of a human body included in an image, searching for an image including a human body having a similar pose and a human body having a similar movement, based on the computed feature value, and putting together the similar poses and the similar movements and classifying. Further, Non-Patent Document 1 (Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299) discloses a technique related to skeleton estimation of a person.

Patent Document 2 (Japanese Patent Application Publication No. 2021-60736) discloses a technique for estimating skeleton data about a person included in an image, computing a weight of a joint, based on a degree of reliability of an estimation result of each joint, and computing, by using the computed weight of each joint, a degree of similarity between the estimated skeleton data and skeleton data estimated from predetermined image data.

Patent Document 3 (International Patent Publication No. WO2022/009327) discloses a technique for computing a degree of similarity of a pose of a human body by using a feature value of each of a plurality of keypoints of a human body included in an image and a weight of each of the keypoints.

DISCLOSURE OF THE INVENTION

Faster search processing is required in the search processing of a similar image, based on a feature value of each of a plurality of keypoints of a human body included in an image. For example, in a scene in which a condition (for example: a threshold value of a degree of similarity, a weight of each keypoint, and the like) of search processing is set, an operator repeatedly performs the search processing while adjusting the condition, and appropriately adjusts the condition while referring to a search result of each time.

When a lot of time is required for the search processing in a scene in which such search processing is repeatedly performed, work efficiency is reduced.

Although Patent Document 1 and Non-Patent Document 1 disclose search processing of a similar image, based on a feature value of each of a plurality of keypoints of a human body included in an image, Patent Document 1 and Non-Patent Document 1 do not disclose a challenge to achieve faster search processing and a solving means thereof.

Although Patent Documents 2 and 3 disclose a technique for computing a degree of similarity by using a weight of each keypoint, Patent Documents 2 and 3 do not disclose a challenge to achieve faster search processing and a solving means thereof.

One example of an object of the present invention is, in view of the problem described above, to provide an image processing system, an apparatus, a processing method, and a program that solve a challenge to achieve faster search processing in the search processing of a similar image, based on a feature value of each of a plurality of keypoints of a human body included in an image.

One aspect of the present invention provides an image processing system including:

- a target image acquisition unit that acquires a target image;
- a skeleton structure detection unit that performs processing of detecting a keypoint of a human body included in the target image;
- a first verification unit that extracts a first reference image whose relationship with the target image satisfies a first extraction condition, from among a plurality of reference images, based on the detected keypoint; and
- a second verification unit that extracts a second reference image whose relationship with the target image satisfies a second extraction condition, from among the first reference images, based on the detected keypoint.

One aspect of the present invention provides an apparatus including:

- a target image acquisition unit that acquires a target image;
- a skeleton structure detection unit that performs processing of detecting a keypoint of a human body included in the target image;
- a first verification unit that extracts a first reference image whose relationship with the target image satisfies a first extraction condition, from among a plurality of reference images, based on the detected keypoint; and
- a second verification unit that extracts a second reference image whose relationship with the target image satisfies a second extraction condition, from among the first reference images, based on the detected keypoint.

One aspect of the present invention provides a processing method including, by one or a plurality of computers:

acquiring a target image;

- performing processing of detecting a keypoint of a human body included in the target image;
- extracting a first reference image whose relationship with the target image satisfies a first extraction condition, from among a plurality of reference images, based on the detected keypoint; and
- extracting a second reference image whose relationship with the target image satisfies a second extraction condition, from among the first reference images, based on the detected keypoint.

One aspect of the present invention provides a program causing a computer to function as:

- a target image acquisition unit that acquires a target image;
- a skeleton structure detection unit that performs processing of detecting a keypoint of a human body included in the target image;
- a first verification unit that extracts a first reference image whose relationship with the target image satisfies a first extraction condition, from among a plurality of reference images, based on the detected keypoint; and a second verification unit that extracts a second reference image whose relationship with the target image satisfies a second extraction condition, from among the first reference images, based on the detected keypoint.

One aspect of the present invention achieves an image processing system, an apparatus, a processing method, and a program that solve a challenge to achieve faster search processing in the search processing of a similar image, based on a feature value of each of a plurality of keypoints of a human body included in an image.

BRIEF DESCRIPTION OF THE DRAWINGS

The above-described object, the other objects, features, and advantages will become more apparent from suitable example embodiment described below and the following accompanying drawings.

FIG. 11 is a diagram schematically illustrating one example of reference image information.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

First Example Embodiment

Figure 1:
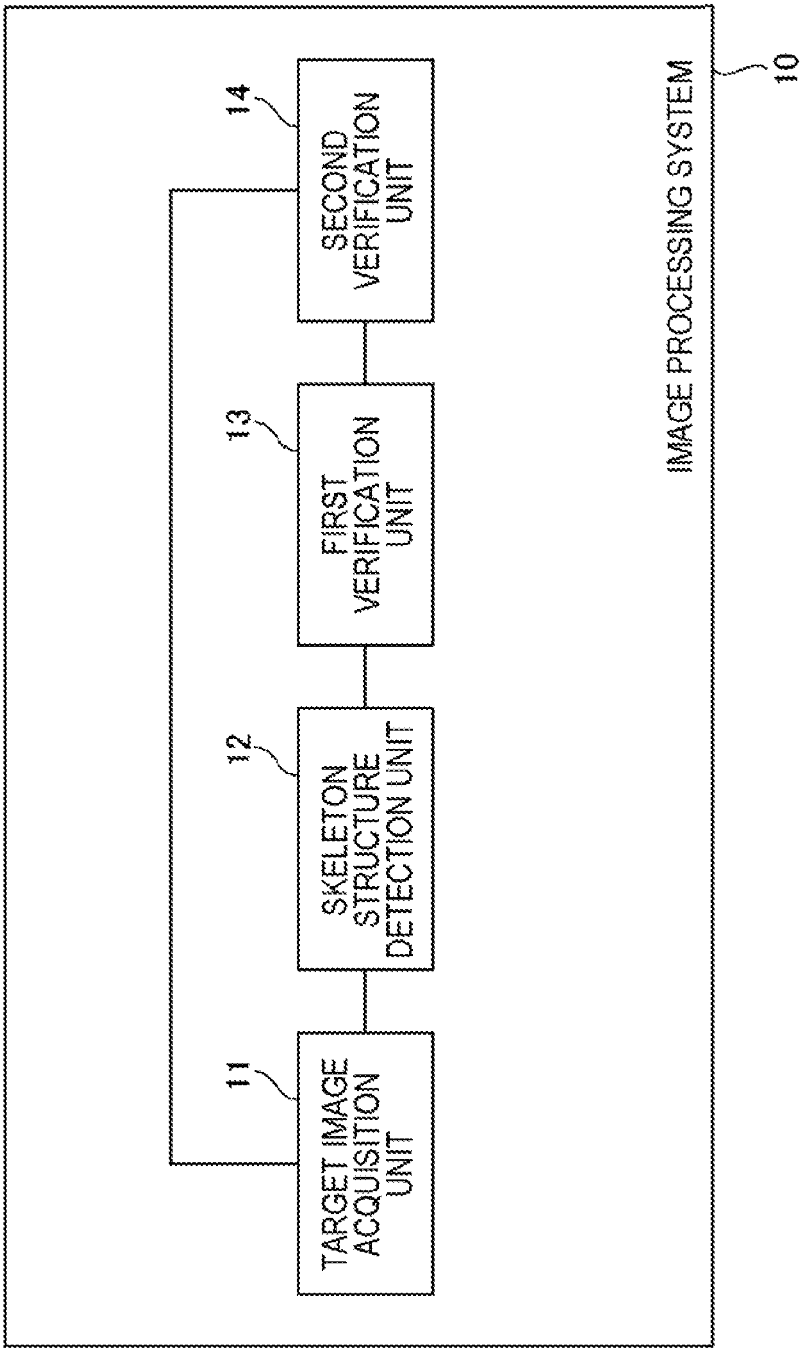
FIG. 1 is a diagram illustrating one example of a functional block diagram of an image processing system.

FIG. 1 is a functional block diagram illustrating an overview of an image processing system 10 according to a first example embodiment. The image processing system 10 includes a target image acquisition unit 11, a skeleton structure detection unit 12, a first verification unit 13, and a second verification unit 14.

The target image acquisition unit 11 acquires a target image. The skeleton structure detection unit 12 performs processing of detecting a keypoint of a human body included in the target image. The first verification unit 13 extracts a first reference image whose relationship with the target image satisfies a first extraction condition from among a plurality of reference images, based on the detected keypoint. The second verification unit 14 extracts a second reference image whose relationship with the target image satisfies a second extraction condition from among the first reference images, based on the detected keypoint.

The image processing system 10 having such a configuration solves a challenge to achieve faster search processing in the search processing of a similar image, based on a feature value of each of a plurality of keypoints of a human body included in an image.

Second Example Embodiment

"Outline"

An image processing system 10 according to the present example embodiment is acquired by further embodying the image processing system 10 according to the first example embodiment. The image processing system 10 according to the present example embodiment performs, in two steps, processing of searching for a desired reference image from among a plurality of reference images. In other words, reference images are narrowed down to some extent in a first step, and a desired reference image is then searched from among the narrowed reference images in a second step.

Figure 2:
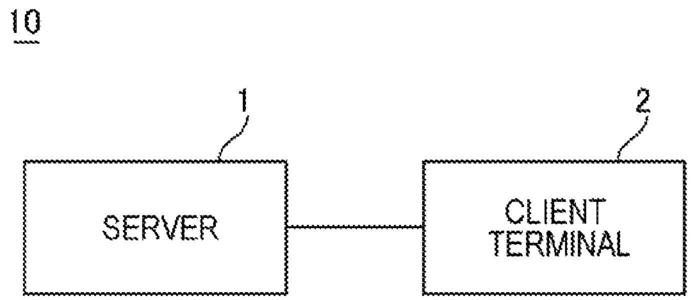
FIG. 2 is a diagram illustrating a configuration example of the image processing system.

As illustrated in FIG. 2, the image processing system 10 according to the present example embodiment includes a server 1 and a client terminal 2. The client terminal 2 is a personal computer, a smartphone, a tablet terminal, a smartwatch, a cellular phone, a television with an Internet connection function, and the like, which are not limited thereto.

In the present example embodiment, the server 1 performs the first step described above. In other words, the server 1 extracts a first reference image whose relationship with a target image satisfies a first extraction condition from among a plurality of reference images. Then, the client terminal 2 performs the second step described above. In other words, the client terminal 2 extracts a second reference image whose relationship with the target image satisfies a second extraction condition from the extracted first reference images (narrowed reference images). Hereinafter, a configuration of the image processing system 10 will be described in detail.

"Hardware Configuration"

Next, one example of a hardware configuration of the image processing system 10 will be described. Each functional unit of the image processing system 10 is achieved by any combination of hardware and software concentrating on as a central processing unit (CPU) of any computer, a memory, a program loaded into the memory, a storage unit such as a hard disc that stores the program (that can also store a program downloaded from a storage medium such as a compact disc (CD), a server on the Internet, and the like in addition to a program previously stored at a stage of shipping of an apparatus), and a network connection interface. Then, various modification examples of an achievement method and an apparatus thereof are understood by a person skilled in the art.

Figure 3:
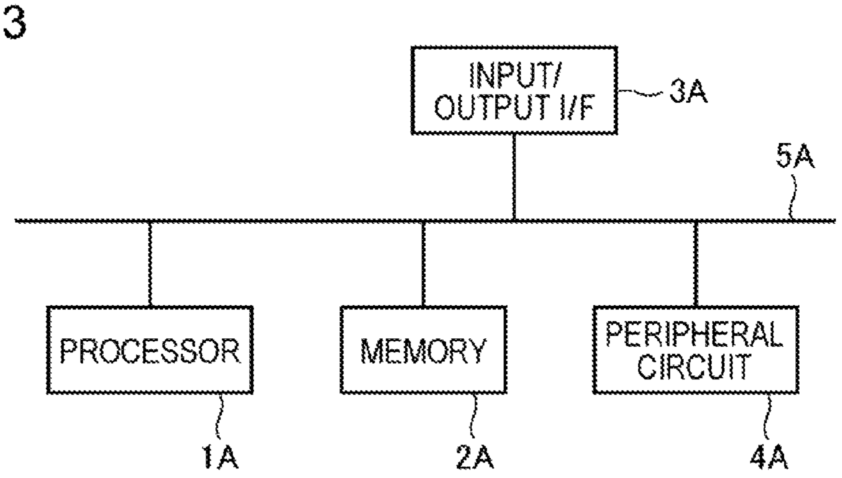
FIG. 3 is a diagram illustrating one example of a hardware configuration of the image processing system.

FIG. 3 is a block diagram illustrating a hardware configuration of the image processing system 10. As illustrated in FIG. 3, the image processing system 10 includes a processor 1A, a memory 2A, an input/output interface 3A, a peripheral circuit 4A, and a bus 5A. Various modules are included in the peripheral circuit 4A. The image processing system 10 may not include the peripheral circuit 4A. Note that, the image processing system 10 may be formed of a plurality of apparatuses (the server 1 and the client terminal 2) being separated physically and/or logically. In this case, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

"Functional Configuration"

Next, a functional configuration of the image processing system 10 according to the present example embodiment will be described in detail. FIG. 1 illustrates one example of the functional block diagram of the image processing system 10. As illustrated, the image processing system 10 includes the target image acquisition unit 11, the skeleton structure detection unit 12, the first verification unit 13, and the second verification unit 14. The server 1 includes the skeleton structure detection unit 12 and the first verification unit 13. Then, the client terminal 2 includes the target image acquisition unit 11 and the second verification unit 14.

The client terminal 2 can communicate with the server 1 via, for example, special-purpose software and a special-purpose application being preinstalled, or a program (such as a Web page) provided by the server 1, can also perform various types of processing, and can achieve a function of the target image acquisition unit 11 and the second verification unit 14. Hereinafter, a configuration of the functional unit of the image processing system 10 will be described.

The target image acquisition unit 11 acquires a target image. The target image is a still image being a target of processing performed by the skeleton structure detection unit 12, the first verification unit 13, and the second verification unit 14.

The target image acquisition unit 11 may receive a user input for specifying one from still images being stored in a predetermined accessible storage apparatus, and acquire the specified still image as a target image. In addition, the target image acquisition unit 11 may acquire, as a target image, a frame image specified by a user from a moving image. The moving image may be captured in the past, or may be a live image. For example, the target image acquisition unit 11 may receive a user input during reproduction of a moving image, and acquire, as a target image, a frame image displayed on a screen at a point in time at which the user input is received. In addition, the target image acquisition unit 11 may acquire, as a target image, a plurality of frame images in order at a time interval specified by a user from a moving image. Note that, the processing of acquiring a target image described herein is merely one example, which is not limited thereto.

As described above, in the present example embodiment, the client terminal 2 includes the target image acquisition unit 11. The target image acquisition unit 11 of the client terminal 2 receives an input for specifying a target image as described above via an input device (such as a touch panel, a physical button, a keyboard, a mouse, and a microphone) of the own apparatus. Then, the target image acquisition unit 11 stores the acquired target image in a storage apparatus in the client terminal 2. Further, the target image acquisition unit 11 transmits the acquired target image to the server 1.

The skeleton structure detection unit 12 performs processing of detecting a keypoint of a human body included in the target image. The skeleton structure detection unit 12 detects N (N is an integer of two or more) keypoints of a human body included in the target image. The processing by the skeleton structure detection unit 12 is achieved by using the technique disclosed in Patent Document 1. Although details will be omitted, in the technique disclosed in Patent Document 1, detection of a skeleton structure is performed by using a skeleton estimation technique such as OpenPose disclosed in Non-Patent Document 1. A skeleton structure detected in the technique is formed of a "keypoint" being a characteristic point such as a joint and a "bone (bone link)" indicating a link between keypoints.

Figure 4:
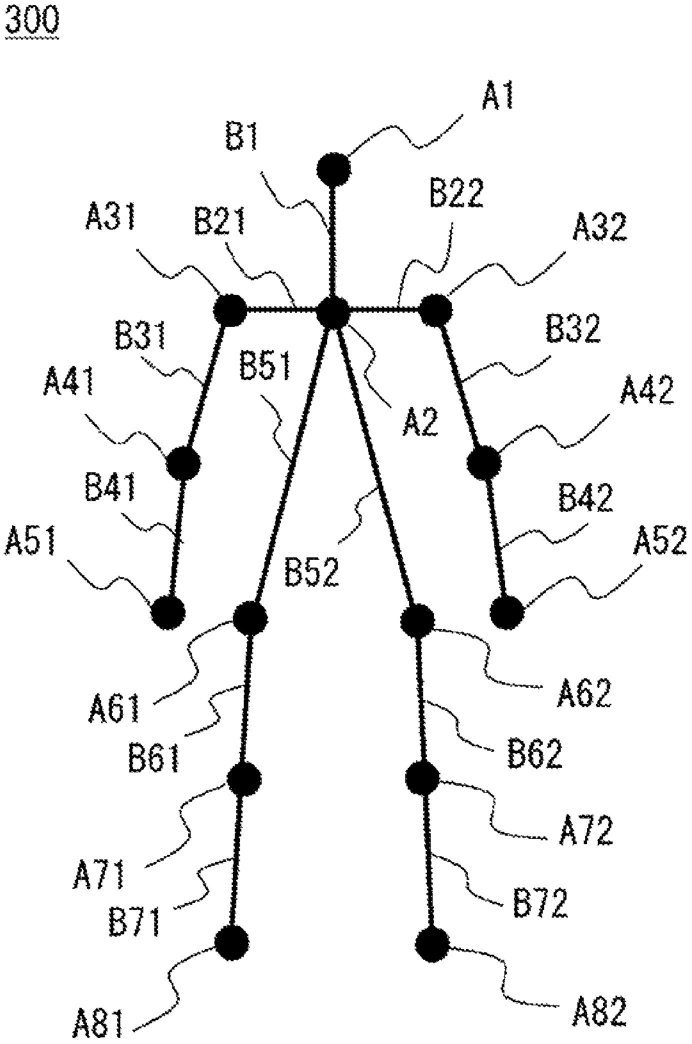
FIG. 4 is a diagram illustrating one example of a skeleton structure of a human model detected by the image processing system.
Figure 5:
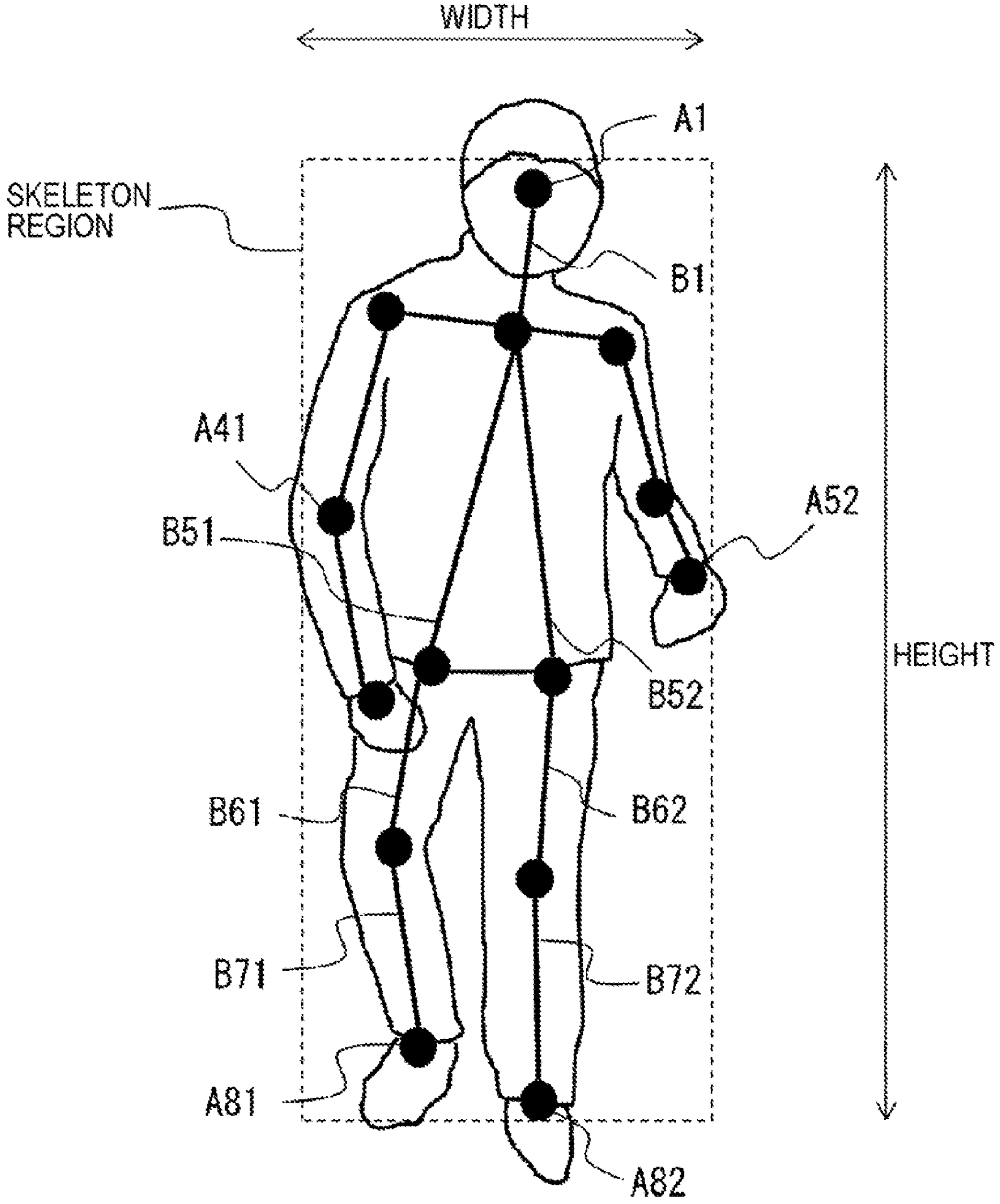
FIG. 5 is a diagram illustrating one example of a skeleton structure of a human model detected by the image processing system.
Figure 6:
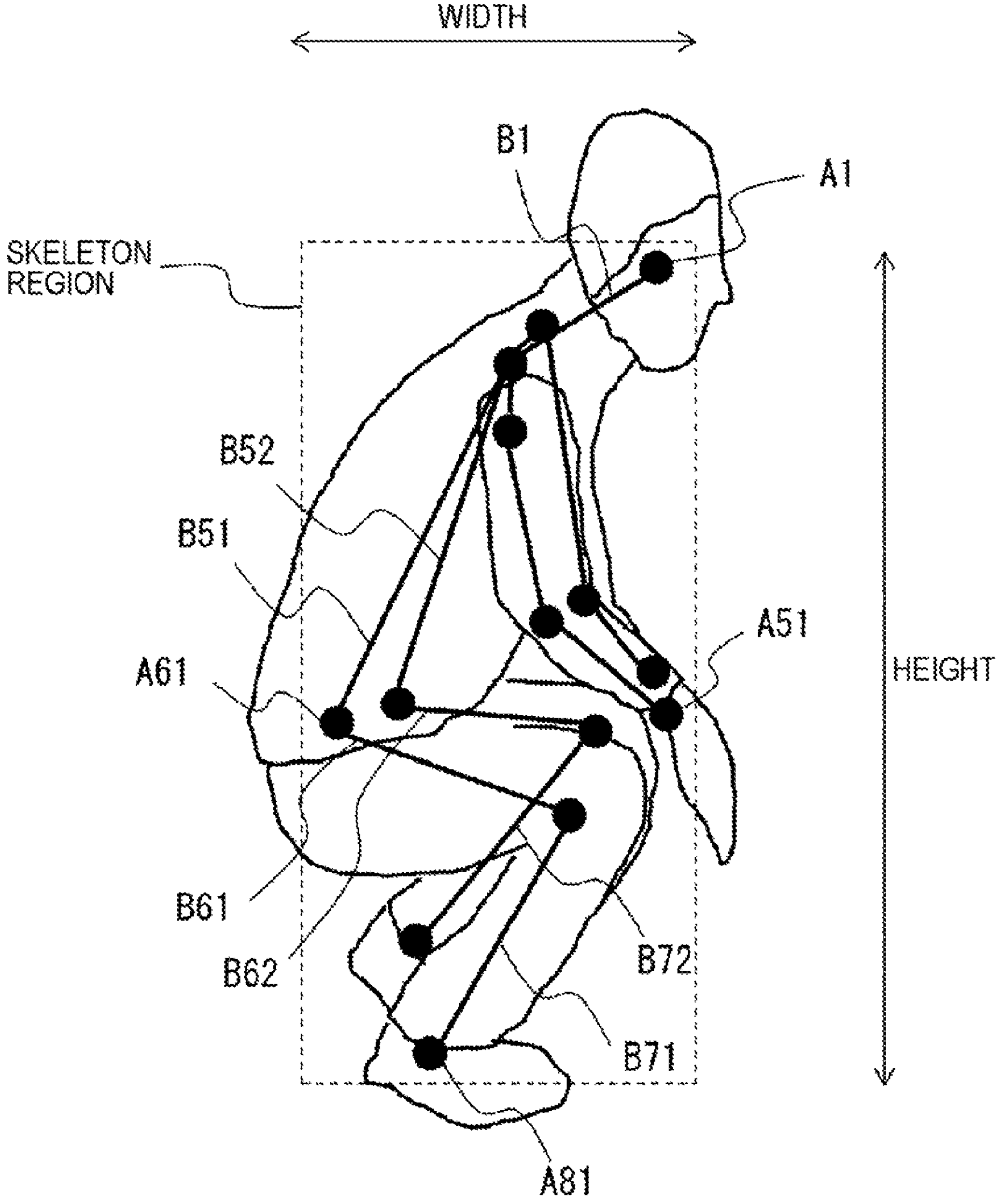
FIG. 6 is a diagram illustrating one example of a skeleton structure of a human model detected by the image processing system.
Figure 7:
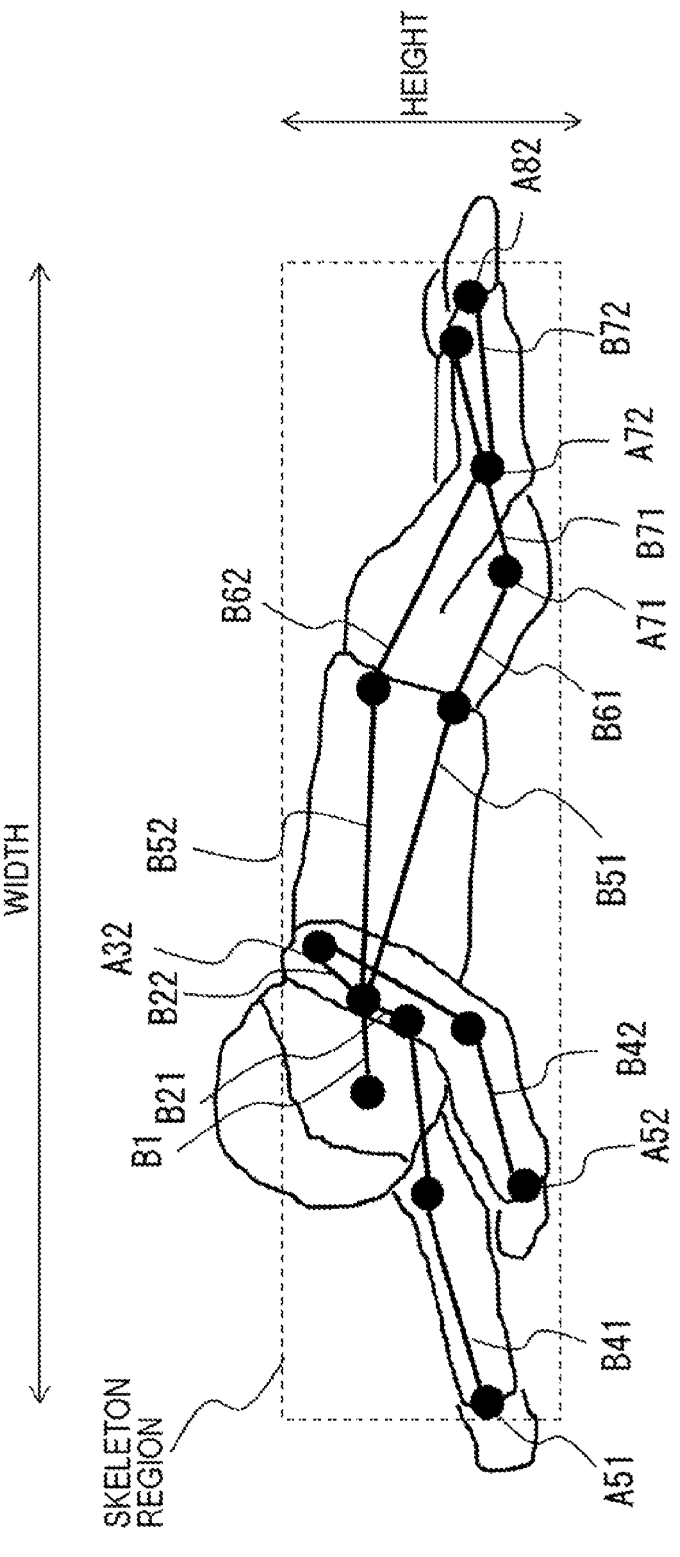
FIG. 7 is a diagram illustrating one example of a skeleton structure of a human model detected by the image processing system.

FIG. 4 illustrates a skeleton structure of a human model 300 detected by the skeleton structure detection unit 12. FIGS. 5 to 7 each illustrate a detection example of the skeleton structure. The skeleton structure detection unit 12 detects the skeleton structure of the human model (two-dimensional skeleton model) 300 as in FIG. 4 from a two-dimensional image by using a skeleton estimation technique such as OpenPose. The human model 300 is a two-dimensional model formed of a keypoint such as a joint of a person and a bone connecting keypoints.

For example, the skeleton structure detection unit 12 extracts a feature point that may be a keypoint from an image, refers to information acquired by performing machine learning on the image of the keypoint, and detects N keypoints of a human body. The detected N keypoints are predetermined. There is variety in the number (i.e., the number of N) of keypoints to be detected and which keypoint is used to detect a portion of a human body, and various variations can be adopted.

For example, as illustrated in FIG. 4, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are determined as N keypoints (N=14) of a detection target. Note that, in the human model 300 illustrated in FIG. 4, as a bone of the person connecting the keypoints, a bone B1 connecting the head A1 and the neck A2, a bone B21 connecting the neck A2 and the right shoulder A31, a bone B22 connecting the neck A2 and the left shoulder A32, a bone B31 connecting the right shoulder A31 and the right elbow A41, a bone B32 connecting the left shoulder A32 and the left elbow A42, a bone B41 connecting the right elbow A41 and the right hand A51, a bone B42 connecting the left elbow A42 and the left hand A52, a bone B51 connecting the neck A2 and the right waist A61, a bone B52 connecting the neck A2 and the left waist A62, a bone B61 connecting the right waist A61 and the right knee A71, a bone B62 connecting the left waist A62 and the left knee A72, a bone B71 connecting the right knee A71 and the right foot A81, and a bone B72 connecting the left knee A72 and the left foot A82 are further predetermined.

FIG. 5 is an example of detecting a person in an upright state. In FIG. 5, the upright person is captured from the front, the bone B1, the bone B51 and the bone B52, the bone B61 and the bone B62, and the bone B71 and the bone B72 that are viewed from the front are each detected without overlapping, and the bone B61 and the bone B71 of a right leg are bent slightly more than the bone B62 and the bone B72 of a left leg.

FIG. 6 is an example of detecting a person in a squatting state. In FIG. 6, the squatting person is captured from a right side, the bone B1, the bone B51 and the bone B52, the bone B61 and the bone B62, and the bone B71 and the bone B72 that are viewed from the right side are each detected, and the bone B61 and the bone B71 of a right leg and the bone B62 and the bone B72 of a left leg are greatly bent and also overlap.

FIG. 7 is an example of detecting a person in a sleeping state. In FIG. 7, the sleeping person is captured diagonally from the front left, the bone B1, the bone B51 and the bone B52, the bone B61 and the bone B62, and the bone B71 and the bone B72 that are viewed diagonally from the front left are each detected, and the bone B61 and the bone B71 of a right leg and the bone B62 and the bone B72 of a left leg are bent and also overlap.

The first verification unit 13 extracts a first reference image whose relationship with the target image satisfies a first extraction condition from among a plurality of reference images being preregistered, based on the keypoint detected by the skeleton structure detection unit 12.

The first extraction condition is a condition that a "degree of similarity of a pose of a human body included in an image" computed by a "first computation method" is "equal to or more than a first reference value". In other words, the first verification unit 13 computes a degree of similarity between a pose of a human body included in the target image and a pose of a human body included in each reference image by the first computation method. Then, the first verification unit 13 extracts, as a first reference image, the reference image whose computed degree of similarity is equal to or more than the first reference value.

The second verification unit 14 extracts a second reference image whose relationship with the target image satisfies a second extraction condition from among the first reference images extracted by the first verification unit 13, based on the keypoint detected by the skeleton structure detection unit 12. In other words, the second verification unit 14 performs verification of the target image with, as verification targets, the reference images (first reference images) narrowed down by the first verification unit 13, and extracts a second reference image from among the first reference images.

The second extraction condition is a condition that a "degree of similarity of a pose of a human body included in an image" computed by a "second computation method" is "equal to or more than a second reference value". In other words, the second verification unit 14 computes a degree of similarity between a pose of a human body included in the target image and a pose of a human body included in each first reference image by the second computation method. Then, the second verification unit 14 extracts, as a second reference image, the first reference image whose computed degree of similarity is equal to or more than the second reference value.

The first computation method and the second computation method may be different from each other or may be the same. For example, in the first computation method and the second computation method, at least one of the number of keypoints and a kind of a keypoint being referred when a degree of similarity of a pose of a human body is computed may be different from each other.

Further, in the first computation method and the second computation method, setting contents of a weight of each keypoint being referred when a degree of similarity of a pose of a human body is computed may be different from each other. For example, in the first computation method, a degree of similarity of a pose of a human body may be computed by setting the same weight of all keypoints, and, in the second computation method, a degree of similarity of a pose of a human body may be computed based on a weight being set for each keypoint. Further, in the first computation method and the second computation method, weights of various keypoints may be different from each other.

Further, a first reference value and a second reference value may be set separately and independently. Thus, the first reference value and the second reference value may be the same value or may be different values.

Further, the first extraction condition and the second extraction condition may include other conditions different from each other. For example, at least one of the first extraction condition and the second extraction condition may include at least one of conditions that

- a predetermined number or more of keypoints being referred when a degree of similarity of a pose of a human body is computed is detected, and
- a predetermined keypoint (for example: head) of keypoints being referred when a degree of similarity of a pose of a human body is computed is detected.

A "predetermined number (minimum detection point)" and a "predetermined keypoint (necessary detection keypoint)" of the conditions may be predetermined, or may be able to be set by a user.

For example, the first extraction condition may include the condition, or the second extraction condition may include the condition.

In addition, both of the first extraction condition and the second extraction condition may include the condition. In that case, contents may be different from each other.

For example, when both of the first extraction condition and the second extraction condition include the condition that a "predetermined number or more of keypoints being referred when a degree of similarity of a pose of a human body is computed is detected", the predetermined number may be able to be set separately and independently. In this case, the predetermined number in the first extraction condition and the predetermined number in the second extraction condition can be the same value or can be different values.

Further, when both of the first extraction condition and the second extraction condition include the condition that a "predetermined keypoint of keypoints being referred when a degree of similarity of a pose of a human body is computed is detected", the predetermined keypoint may be able to be set separately and independently. In this case, a kind and the number of the predetermined keypoint in the first extraction condition and the predetermined keypoint in the second extraction condition can have the same content or can have different contents.

Further, in the second extraction condition, at least one of the plurality of items (the number of keypoints being referred when a degree of similarity of a pose of a human body is computed, a kind of a keypoint, a weight of each keypoint, a minimum detection point, and a necessary detection keypoint) described above may be able to be changed by a user input. Then, in the first extraction condition, the plurality of items described above may be fixed.

Herein, a specific example of the first extraction condition and the second extraction condition will be described. Note that, the example herein is merely one example, and the first extraction condition and the second extraction condition according to the present example embodiment are not limited to this.

The first extraction condition is a condition that a "degree of similarity of a pose of a human body computed based on all N keypoints is equal to or more than a first reference value". Note that, the degree of similarity of the first extraction condition is computed with the same weight of the N keypoints.

The second extraction condition is a condition that a "degree of similarity of a pose of a human body computed based on some of N keypoints is equal to or more than a second reference value". Note that, the degree of similarity of the second extraction condition is computed based on a weight being set for each keypoint.

Then, in the second extraction condition, the number of keypoints, a kind of a keypoint, and a weight of each keypoint being referred when a degree of similarity of a pose of a human body is computed can be changed by a user input. On the other hand, in the first extraction condition, the number of keypoints, a kind of a keypoint, and a weight of each keypoint being referred when a degree of similarity of a pose of a human body is computed are fixed.

Further, in the second extraction condition, the second reference value can be changed by a user input. In the first extraction condition, the first reference value may be able to be changed by a user input, or may be a fixed value.

Further, the second extraction condition further includes at least one of conditions that

- a predetermined number or more of keypoints being referred when a degree of similarity of a pose of a human body is computed is detected, and
- a predetermined keypoint of keypoints being referred when a degree of similarity of a pose of a human body is computed is detected.

A "predetermined number" and a "predetermined keypoint" of the conditions may be predetermined, or may be able to be changed by a user input. Note that, the first extraction condition does not include the conditions.

Herein, one example of processing of computing a degree of similarity between a pose of a human body detected from a target image and a pose of a human body indicated by a preregistered reference image, based on a keypoint detected by the skeleton structure detection unit 12, will be described.

There are various ways of computing a degree of similarity of a pose of a human body, and various techniques can be adopted. For example, the technique disclosed in Patent Document 1 may be adopted. Hereinafter, one example will be described, which is not limited thereto.

As one example, by computing a feature value of a skeleton structure indicated by a detected keypoint, and computing a degree of similarity between a feature value of a skeleton structure of a human body detected from a target image and a feature value of a skeleton structure of a human body indicated by a reference image, the degree of similarity between the poses of the two human bodies may be computed.

The feature value of the skeleton structure indicates a feature of a skeleton of a person, and is an element for classifying a pose of the person, based on the skeleton of the person. This feature value normally includes a plurality of parameters. Then, the feature value being referred in computation of a degree of similarity may be a feature value of the entire skeleton structure, may be a feature value of a part of the skeleton structure, or may include a plurality of feature values as in each portion of the skeleton structure. A method for computing a feature value may be any method such as machine learning and normalization, and a minimum value and a maximum value may be acquired as normalization. As one example, the feature value is a feature value acquired by performing machine learning on the skeleton structure, a size of the skeleton structure from a head to a foot on an image, a relative positional relationship among a plurality of keypoints in an up-down direction in a skeleton region including the skeleton structure on the image, a relative positional relationship among a plurality of keypoints in the left-right direction in the skeleton structure, an and the like. The size of the skeleton structure is a height in the up-down direction, an area, and the like of a skeleton region including the skeleton structure on an image. The up-down direction (a height direction or a vertical direction) is a direction (Y-axis direction) of up and down in an image, and is, for example, a direction perpendicular to the ground (reference surface). Further, the left-right direction (a horizontal direction) is a direction (X-axis direction) of left and right in an image, and is, for example, a direction parallel to the ground.

Note that, in order to perform a search desired by a user, a feature value having robustness with respect to search processing is preferably used. For example, when a user desires a search that does not depend on an orientation and a body shape of a person, a feature value that is robust with respect to the orientation and the body shape of the person may be used. A feature value that does not depend on an orientation and a body shape of a person can be acquired by learning skeletons of persons facing in various directions with the same pose and skeletons of persons having various body shapes with the same pose, and extracting a feature only in the up-down direction of a skeleton. One example of the processing of computing a feature value of a skeleton structure is disclosed in Patent Document 1.

Figure 8:
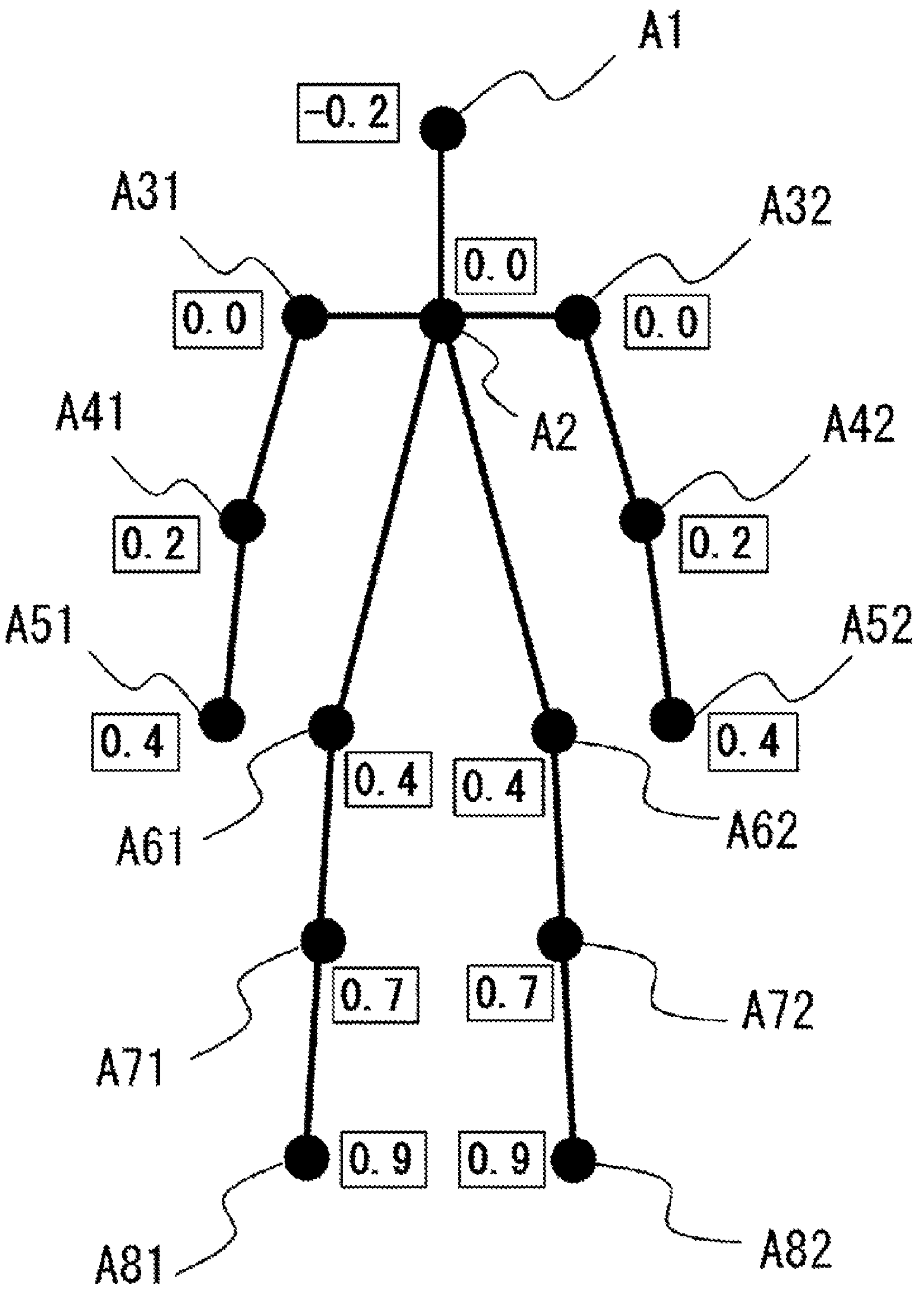
FIG. 8 is a diagram illustrating one example of a feature value of a keypoint computed by the image processing system.

FIG. 8 illustrates an example of a feature value of each of a plurality of keypoints. A set of feature values of the plurality of keypoints is a feature value of a skeleton structure. Note that, a feature value of a keypoint illustrated herein is merely one example, which is not limited thereto.

Figure 9:
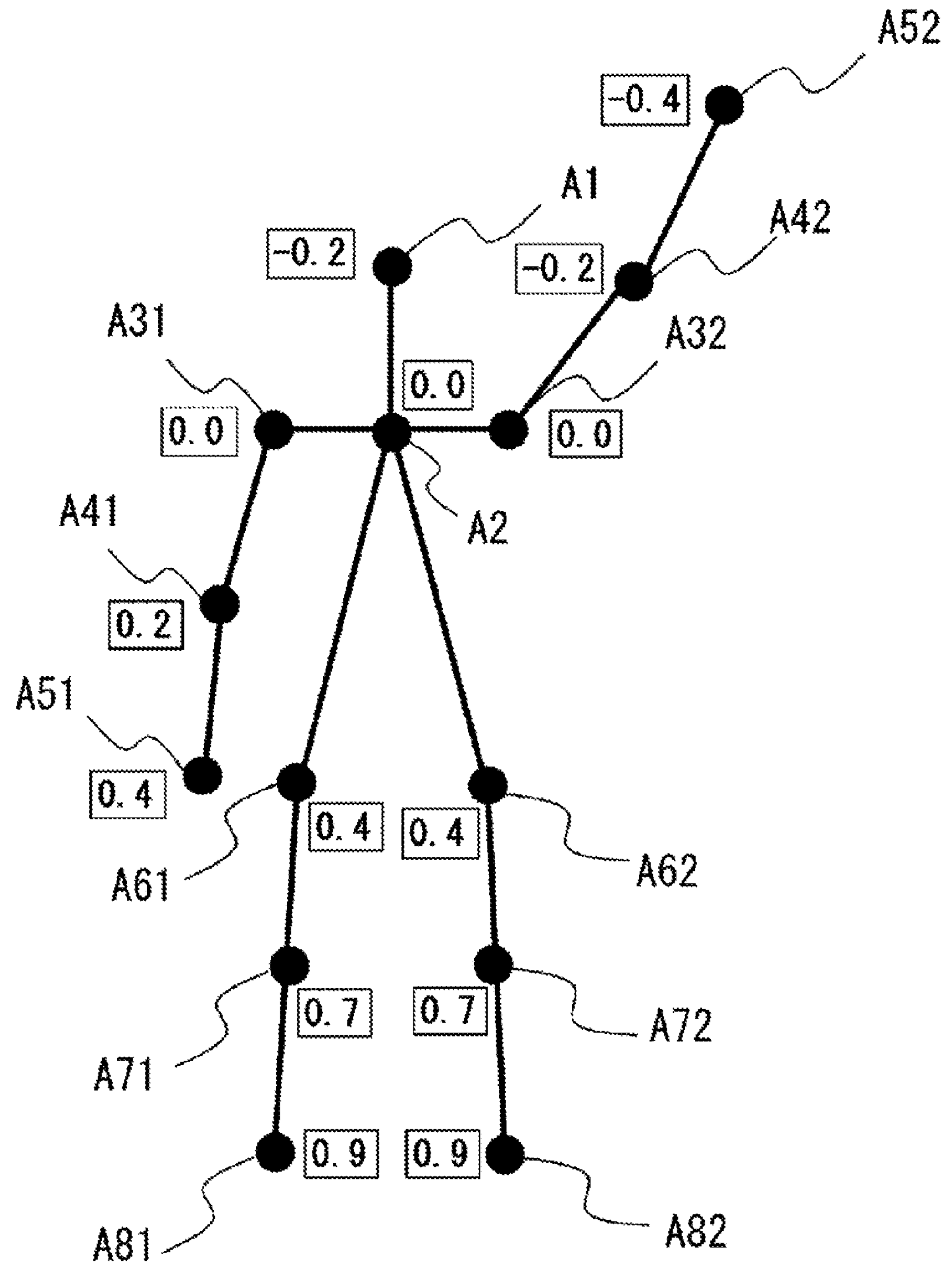
FIG. 9 is a diagram illustrating one example of a feature value of a keypoint computed by the image processing system.
Figure 10:
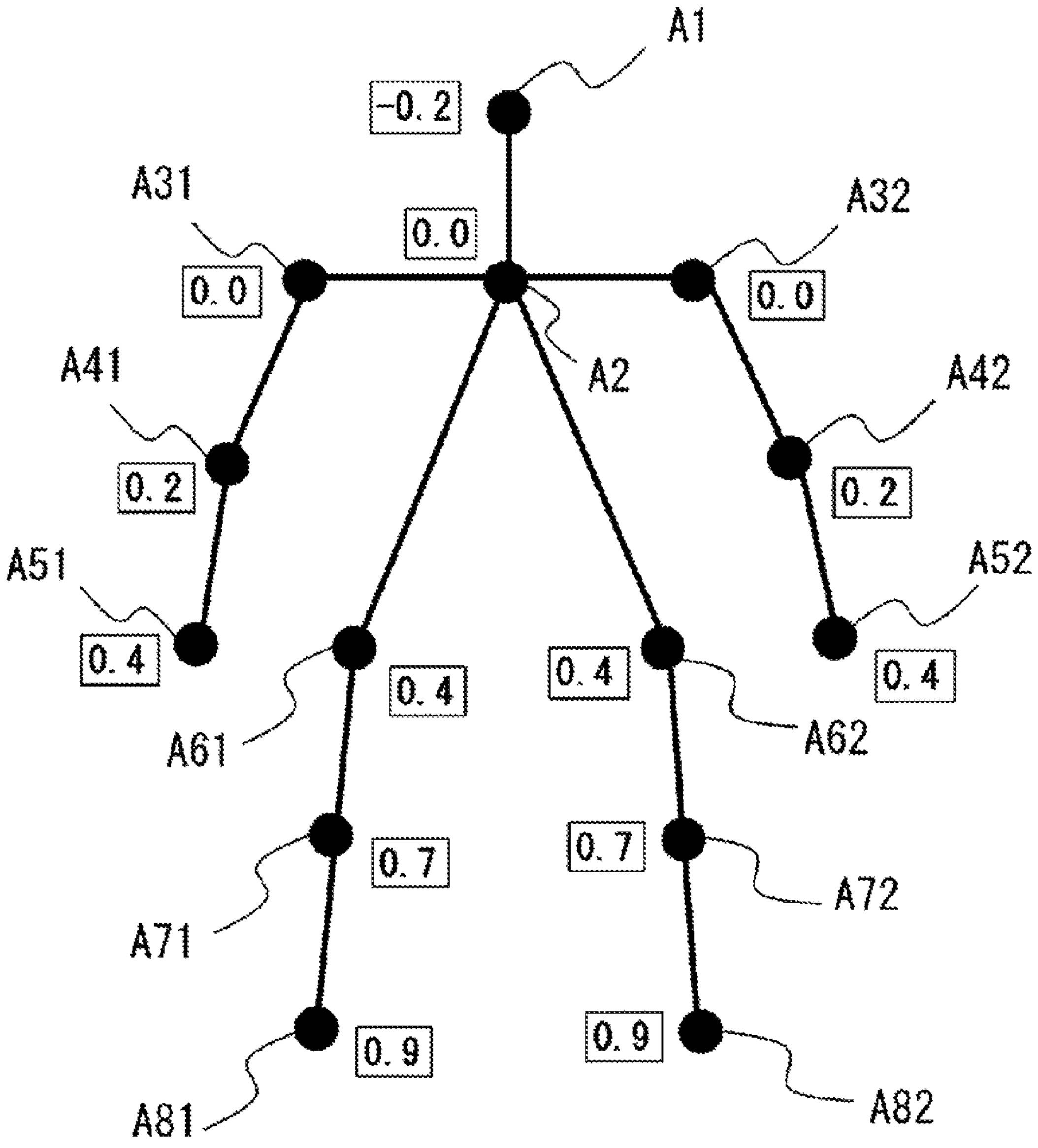
FIG. 10 is a diagram illustrating one example of a feature value of a keypoint computed by the image processing system.

In this example, the feature value of the keypoint indicates a relative positional relationship among a plurality of keypoints in the up-down direction in a skeleton region including a skeleton structure on an image. Since the keypoint A2 of the neck is the reference point, a feature value of the keypoint A2 is 0.0 and a feature value of a keypoint A31 of a right shoulder and a keypoint A32 of a left shoulder at the same height as the neck is also 0.0. A feature value of a keypoint A1 of a head higher than the neck is −0.2. A feature value of a keypoint A51 of a right hand and a keypoint A52 of a left hand lower than the neck is 0.4, and a feature value of the keypoint A81 of the right foot and the keypoint A82 of the left foot is 0.9. When the person raises the left hand from this state, the left hand is higher than the reference point as in FIG. 9, and thus a feature value of the keypoint A52 of the left hand is −0.4. Meanwhile, since normalization is performed by using only a coordinate of the Y axis, as in FIG. 10, a feature value does not change as compared to FIG. 8 even when a width of the skeleton structure changes. In other words, a feature value (normalization value) in the example indicates a feature of a skeleton structure (keypoint) in the height direction (Y direction), and is not affected by a change of the skeleton structure in the horizontal direction (X direction).

There are various ways of computing a degree of similarity of a pose indicated by such a feature value. For example, after a degree of similarity between feature values is computed for each keypoint, a degree of similarity between poses may be computed based on the degree of similarity between the feature values of the plurality of keypoints. For example, an average value, a maximum value, a minimum value, a mode, a medium value, a weighted average value, a weighted sum, and the like of a degree of similarity between feature values of a plurality of keypoints may be computed as a degree of similarity between poses. When a weighted average value and a weighted sum are computed, a weight of each keypoint may be able to be set by a user, or may be predetermined.

Herein, in FIG. 11, reference image information registered in the image processing system 10 in advance will be described. In the present example embodiment, a reference image and reference image information are registered in the server 1. In the reference image information illustrated in FIG. 11, reference image identification information, a data name, and a feature value are associated with one another.

The reference image identification information is information that identifies a plurality of reference images from each other.

The data name is information provided to each reference image. The same data name can be provided to a plurality of reference images. Further, a plurality of data names can be provided to one reference image. The data name can be associated with a content (such as a pose of a human body, and a perspective of a target object) of an image, and the like. Illustrated "wheelchair/bird's-eye view" is provided to a reference image that includes a person in a wheelchair and includes the person captured in such a way that the person is looked down from the above. In addition, a data name of "cellular phone/right hand/bird's-eye view" may be provided to a reference image including a person who is holding a cellular phone with a right hand and talking on the phone. For example, a data name of "wheelchair/bird's-eye view" and a data name of "cellular phone/right hand/bird's-eye view" may be provided to a reference image including a person in a wheelchair who is holding a cellular phone with a right hand and talking on the phone.

A feature value is a feature value (for example: a set of feature values of each keypoint) of a pose of a human body included in each reference image.

Note that, the client terminal 2 may receive a user input for specifying a data name in addition to a user input for specifying a target image. Then, the client terminal 2 may transmit, to the server 1, a content of the user input for specifying the data name in addition to the specified target image. In this case, the first verification unit 13 may extract a reference image associated with the specified data name from among reference images, and then extract a first reference image that satisfies the first extraction condition from among the extracted reference images. In a case of such a configuration, reference images being search targets can be narrowed down by a data name, and faster search processing is achieved.

Note that, a content of the "user input for specifying a data name" described above can adopt various configurations. For example, the client terminal 2 may receive an input for directly specifying one or a plurality of data names as the "user input for specifying a data name" described above. In addition, the server 1 may create a group by putting together a plurality of data names having a common point, and manage each group by associating a label name with the group. For example, a label name of "use of cellular phone" may be associated with a group acquired by putting together data names such as "cellular phone/right hand/bird's-eye view" and "cellular phone/left hand/bird's-eye view". Then, the client terminal 2 may receive an input for selecting a label name as the "user input for specifying a data name" described above. In this case, a data name associated with a group of the selected label name is specified.

Figure 12:
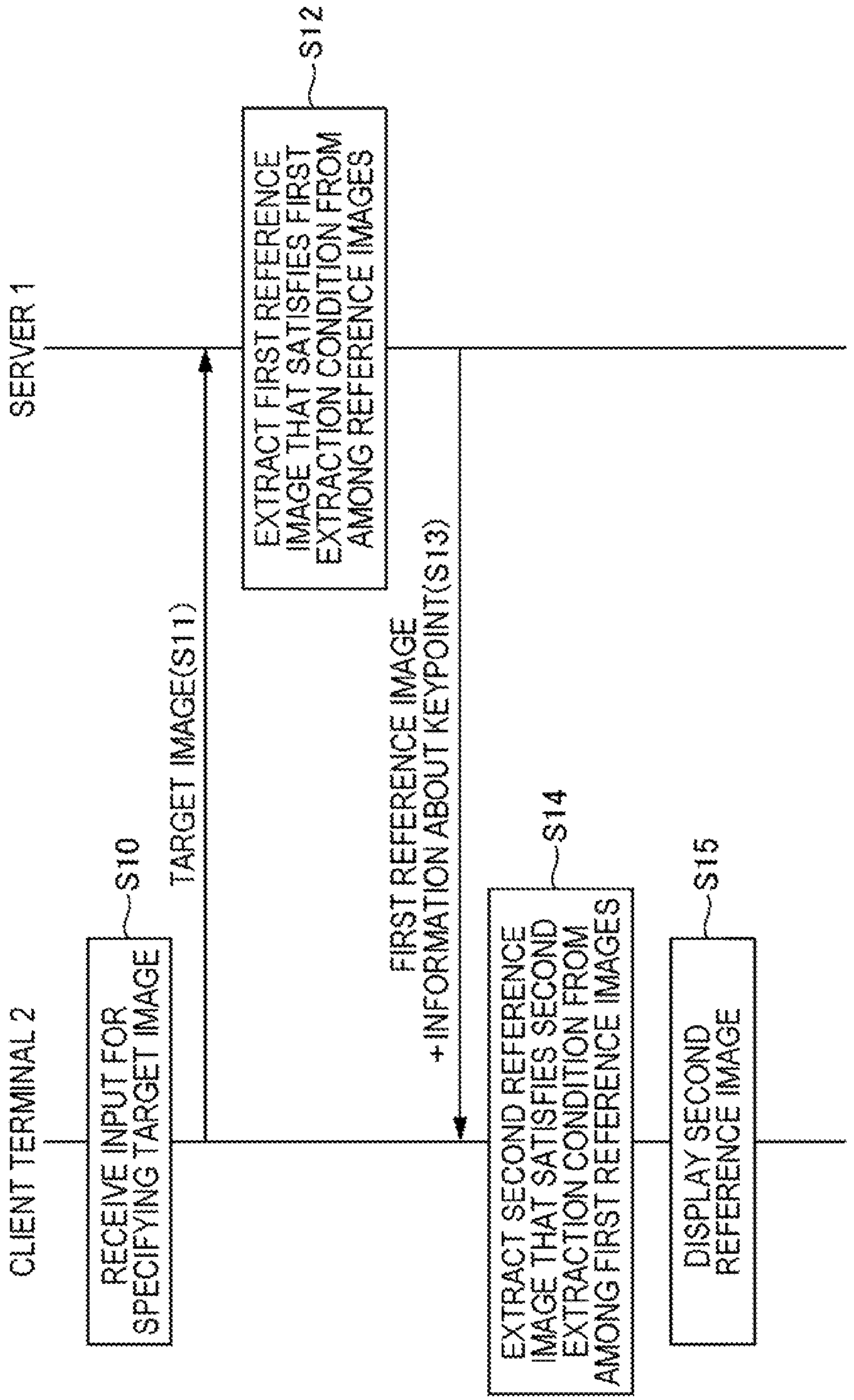
FIG. 12 is a sequence diagram illustrating one example of a flow of processing of the image processing system.

Herein, one example of a flow of processing of the image processing system 10 formed of the server 1 and the client terminal 2 will be described by using a sequence diagram in FIG. 12.

First, the client terminal 2 receives a user input for specifying a target image (S10). Next, the client terminal 2 transmits the specified target image to the server 1 (S11).

The server 1 performs processing of detecting a keypoint of a human body included in the target image, and then extracts a first reference image whose relationship with the target image satisfies a first extraction condition from among a plurality of reference images, based on the detected keypoint (S12). Next, the server 1 transmits, to the client terminal 2, the first reference image, information (for example: a feature value, and the like) about a keypoint of a human body detected from each first reference image (see FIG. 11), and information (for example: a feature value, and the like) about a keypoint of a human body detected from the target image (S13).

The client terminal 2 extracts a second reference image whose relationship with the target image specified in S10 satisfies a second extraction condition from among the received first reference images, based on the information about the keypoint of the human body detected from each of the received first reference images and the information about the keypoint of the human body detected from the target image (S14). Then, the client terminal 2 displays the extracted second reference image (S15). The display is achieved by display on a display, projection of a video using a projection apparatus, and the like.

Note that, the client terminal 2 can store the data (image and information) received in S13 in the storage apparatus of the client terminal 2, and repeatedly perform the processing in S14 and S15 by using the data.

For example, a user may perform an input for changing a second extraction condition on the client terminal 2. Then, the client terminal 2 may extract a second reference image whose relationship with the target image specified in S10 satisfies the second extraction condition after the change from among the received first reference images (S14), and may display the extracted second reference image (S15). The processing will be described in detail in a fifth example embodiment.

In addition, a plurality of second extraction conditions may be set in advance. Then, the client terminal 2 may extract a second reference image whose relationship with the target image specified in S10 satisfies each of the plurality of second extraction conditions from among the received first reference images (S14), and may separately display the second reference image being extracted based on each of the plurality of second extraction conditions (S15).

In this way, in a case where extraction based on a second extraction condition is performed for a plurality of times, when both of extraction based on a first extraction condition and the extraction based on the second extraction condition are performed each time, a processing load on a computer increases, and a processing speed is also reduced. As in the example, with the configuration in which the first extraction processing (S12) and the second extraction processing (S14) are separated, and the second extraction processing for a plurality of times can be performed in association with the first extraction processing once, a processing load on the computer is reduced, and a processing speed also increases.

Advantageous Effect

The image processing system 10 according to the present example embodiment can perform, in two separate steps, extraction processing (search processing) of a similar image, based on a feature value of each of a plurality of keypoints of a human body included in an image. In other words, reference images being search targets can be narrowed down in the first step, and an image similar to a target image can be then searched from among the narrowed reference images in the second step. In this way, by performing, in the two separate steps, the search processing of a similar image, based on a feature value of each of a plurality of keypoints of a human body included in an image, faster search processing can be achieved.

For example, in a case of the two separate steps, by storing a result in the first step, the second step for a plurality of times can be performed by using the result. In other words, the second step can be performed for a plurality of times in association with the first step once. In contrast, when the extraction processing is not divided into two steps, all the extraction processing needs to be performed every time. According to the image processing system 10 in the present example embodiment as compared with such a comparative example, a processing load on a computer is reduced, and a processing speed also increases.

Further, in the present example embodiment, in the first extraction condition in the first step, the number of keypoints, a kind of a keypoint, and a weight of each keypoint being referred when a degree of similarity of a pose of a human body is computed can be fixed, and, in the second extraction condition in the second step, the items can be changed by a user input. As a technique related to a high speed of a search, there is a technique for storing data in a database while clustering, and performing a search by narrowing down clusters similar to a query at a time of the search. However, when a search is performed while changing a search condition each time, similarity between pieces of data changes due to the search condition, and thus the technique described above cannot be used and a search becomes slower. For this problem, by fixing the first extraction condition in the first step and allowing a change in the second extraction condition in the second step, the first extraction condition (step of narrowing down from a massive amount of data) can become faster, and a search condition (second extraction condition) in the second step can also be changed, and thus a targeted search can be performed at a high speed.

Third Example Embodiment

As illustrated in FIG. 2, an image processing system 10 according to the present example embodiment also includes a server 1 and a client terminal 2.

In the second example embodiment, extraction processing (search processing) of a similar image, based on a feature value of each of a plurality of keypoints of a human body included in an image is divided into two steps, the server 1 performs the first step, and the client terminal 2 performs the second step. In contrast, in the present example embodiment, the server 1 performs both of the first step and the second step. Details will be described below.

FIG. 1 illustrates one example of a functional block diagram of the image processing system 10. As illustrated, the image processing system 10 includes a target image acquisition unit 11, a skeleton structure detection unit 12, a first verification unit 13, and a second verification unit 14. The server 1 includes the skeleton structure detection unit 12, the first verification unit 13, and the second verification unit 14. Then, the client terminal 2 includes the target image acquisition unit 11. A configuration of each functional unit is as described in the second example embodiment.

Figure 13:
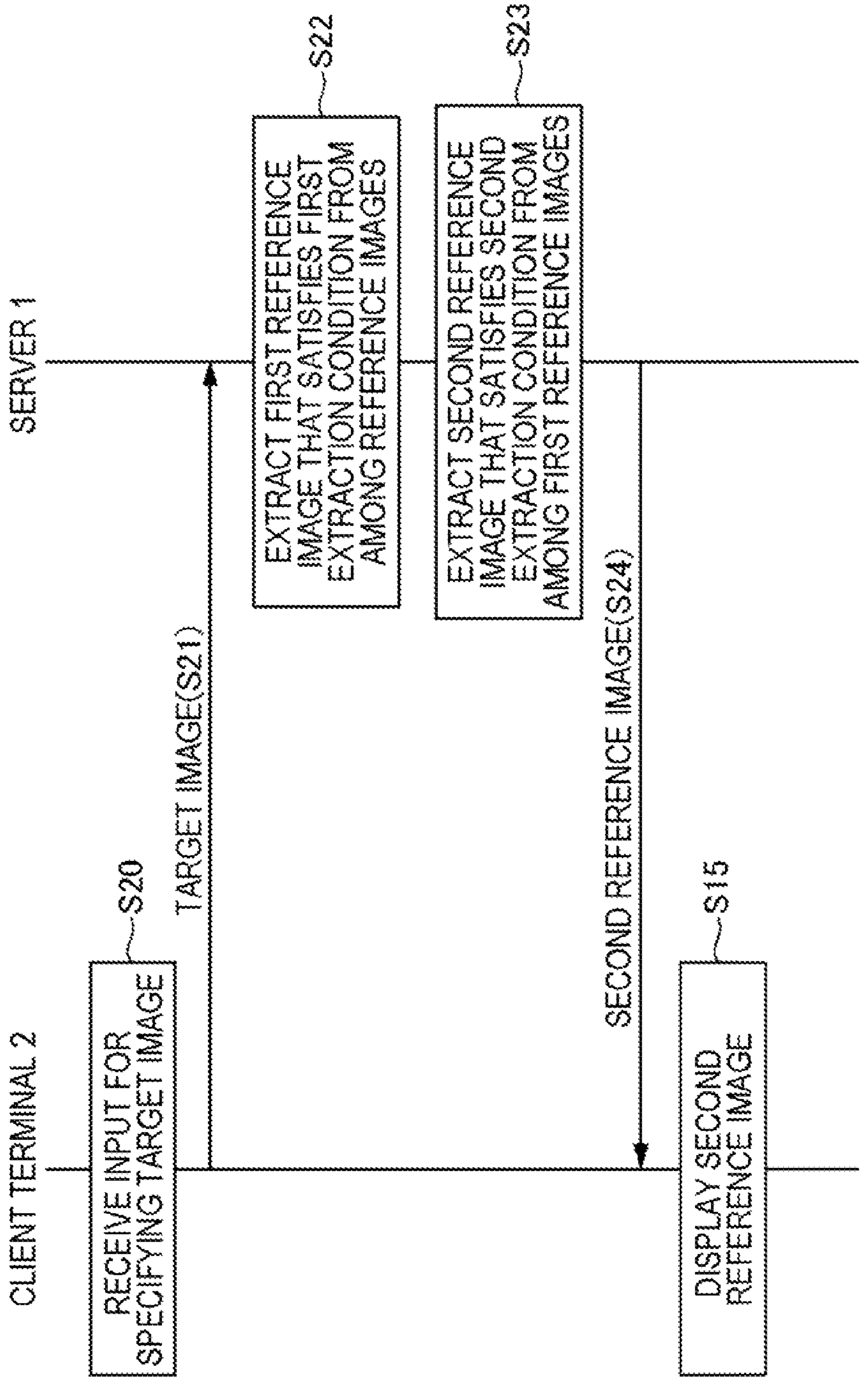
FIG. 13 is a sequence diagram illustrating one example of a flow of processing of the image processing system.

Herein, one example of a flow of processing of the image processing system 10 formed of the server 1 and the client terminal 2 will be described by using a sequence diagram in FIG. 13.

First, the client terminal 2 receives a user input for specifying a target image (S20). Next, the client terminal 2 transmits the specified target image to the server 1 (S21).

The server 1 performs processing of detecting a keypoint of a human body included in the target image, and then extracts a first reference image whose relationship with the target image satisfies a first extraction condition from among a plurality of reference images, based on the detected keypoint (S22). Next, the server 1 extracts a second reference image whose relationship with the target image received in S21 satisfies a second extraction condition from among the first reference images extracted in S22, based on the detection result of the keypoint in S22 (S23). Then, the server 1 transmits the extracted second reference image to the client terminal 2 (S24).

Subsequently, the client terminal 2 displays the received second reference image (S25). The display is achieved by display on a display, projection of a video using a projection apparatus, and the like.

Note that, the server 1 can store the data (image and information) acquired in the processing in S22 in the storage apparatus of the own apparatus, and repeatedly perform the processing in S23 and S24 by using the data. Then, when the client terminal 2 newly receives a second reference image (S24), the client terminal 2 can display the newly received second reference image.

For example, a user may perform an input for changing a second extraction condition on the client terminal 2. Then, the client terminal 2 may transmit the second extraction condition after the change to the server 1. Then, the server 1 may extract a second reference image whose relationship with the target image received in S21 satisfies the second extraction condition after the change from among the first reference images extracted in S22 (S23), and may transmit the extracted second reference image to the client terminal 2 (S24). The processing will be described in detail in the fifth example embodiment.

In addition, a plurality of second extraction conditions may be set in advance. Then, the server 1 may extract a second reference image whose relationship with the target image specified in S20 satisfies each of the plurality of second extraction conditions from among the first reference images extracted in S22 (S23), and may transmit, to the client terminal 2, the second reference image extracted based on each of the plurality of second extraction conditions, in an identifiable manner from each other (S24).

In this way, in a case where extraction based on a second extraction condition is performed for a plurality of times, when both of extraction based on a first extraction condition and the extraction based on the second extraction condition are performed each time, a processing load on a computer increases, and a processing speed is also reduced. As in the example, with the configuration in which the first extraction processing (S22) and the second extraction processing (S23) are separated, and the second extraction processing can be performed for a plurality of times in association with the first extraction processing once, a processing load on the computer is reduced, and a processing speed also increases.

Another configuration of the image processing system 10 according to the present example embodiment is similar to the configuration of the image processing system 10 according to the first and second example embodiments.

The image processing system 10 according to the present example embodiment achieves an advantageous effect similar to that of the image processing system 10 according to the first and second example embodiments. Further, according to the image processing system 10 in the present example embodiment, a processing load on the client terminal 2 is reduced.

Fourth Example Embodiment

An image processing system 10 according to the present example embodiment is formed of one apparatus physically and/or logically. One example of a functional block diagram of the image processing system 10 according to the present example embodiment is illustrated in FIG. 1. In the present example embodiment, one apparatus physically and/or logically includes a target image acquisition unit 11, a skeleton structure detection unit 12, a first verification unit 13, and a second verification unit 14, and performs the processing described in the first to third example embodiments.

Another configuration of the image processing system 10 according to the present example embodiment is similar to the configuration of the image processing system 10 according to the first to third example embodiments. The image processing system 10 according to the present example embodiment also achieves an advantageous effect similar to that of the image processing system 10 according to the first to third example embodiments.

Fifth Example Embodiment

An image processing system 10 according to the present example embodiment has a function of changing a second extraction condition. Details will be described below.

Figure 14:
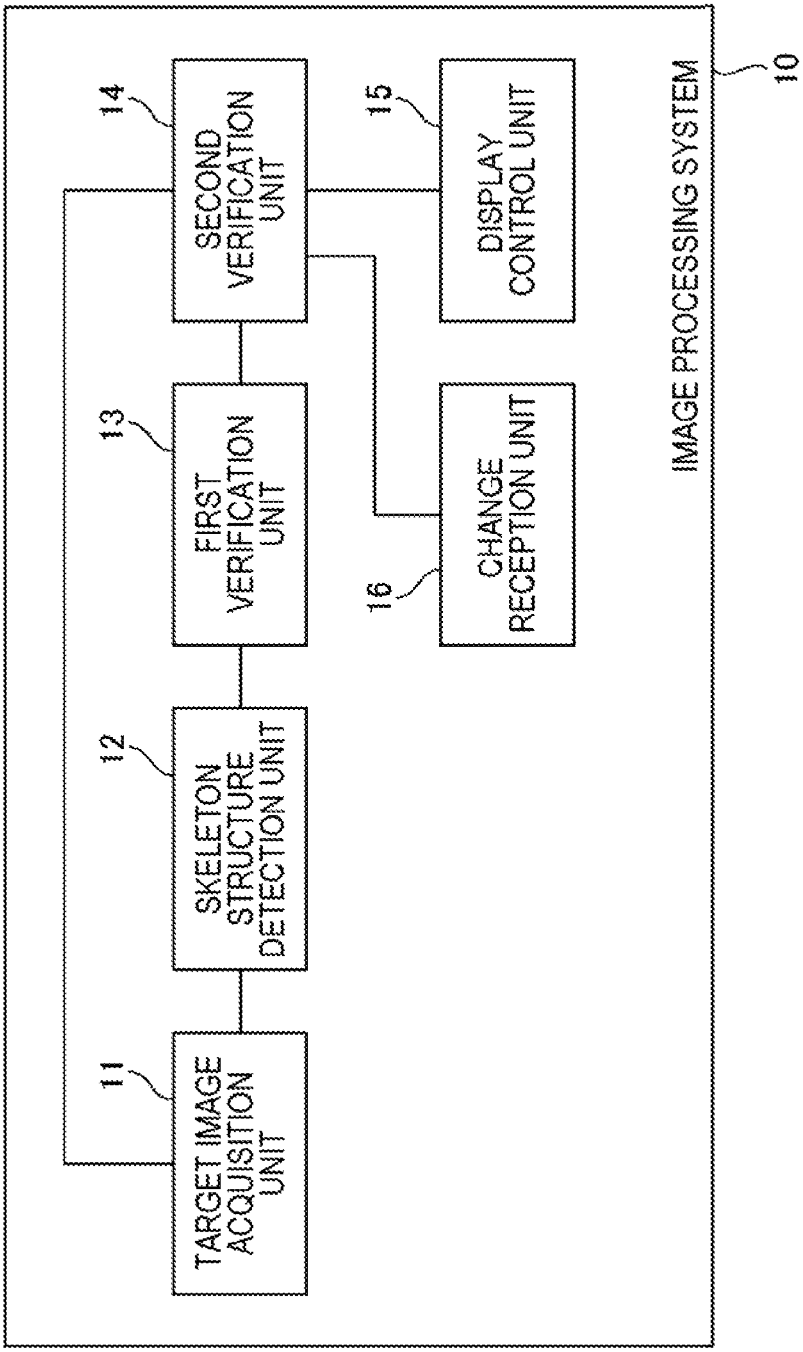
FIG. 14 is a diagram illustrating one example of a functional block diagram of the image processing system.

FIG. 14 illustrates one example of a functional block diagram of the image processing system 10. As illustrated, the image processing system 10 includes a target image acquisition unit 11, a skeleton structure detection unit 12, a first verification unit 13, a second verification unit 14, a display control unit 15, and a change reception unit 16.

The display control unit 15 displays a second reference image extracted by the second verification unit 14 on a display apparatus. For example, when the image processing system 10 is formed of a server 1 and a client terminal 2 as in the second and third example embodiments, the display control unit 15 displays a second reference image on a display apparatus (such as a display and a projection apparatus) of the client terminal 2. Further, when the image processing system 10 is formed of one apparatus physically and/or logically as in the fourth example embodiment, the display control unit 15 displays a second reference image on a display apparatus (such as a display and a projection apparatus) of the one apparatus.

The change reception unit 16 receives an input for changing a second extraction condition. For example, the change reception unit 16 may receive an input for changing at least one of a second reference value defined in the second extraction condition, the number of keypoints being referred when a degree of similarity of a pose of a human body is computed, a kind of a keypoint being referred when a degree of similarity of a pose of a human body is computed, a weight of each keypoint being referred when a degree of similarity of a pose of a human body is computed, a minimum detection point, and a necessary detection keypoint.

The minimum detection point is a predetermined number in a condition that a "predetermined number or more of keypoints being referred when a degree of similarity of a pose of a human body is computed is detected" that can be included in the second extraction condition described in the second example embodiment.

The necessary detection keypoint is a predetermined keypoint in a condition that a "predetermined keypoint of keypoints being referred when a degree of similarity of a pose of a human body is computed is detected" that can be included in the second extraction condition described in the second example embodiment.

When the image processing system 10 is formed of the server 1 and the client terminal 2 as in the second and third example embodiments, the change reception unit 16 can receive an input for changing a second extraction condition via an input apparatus (such as a touch panel, a physical button, a keyboard, a mouse, and a microphone) of the client terminal 2. Further, when the image processing system 10 is formed of one apparatus physically and/or logically as in the fourth example embodiment, the change reception unit 16 can receive an input for changing a second extraction condition via an input apparatus (such as a touch panel, a physical button, a keyboard, a mouse, and a microphone) of the one apparatus.

Note that, in response to reception of an input for changing a second extraction condition by the change reception unit 16, the second verification unit 14 newly extracts a second reference image whose relationship with a target image satisfies the second extraction condition after the change from among first reference images. Then, the display control unit 15 changes a content to be displayed on the display apparatus from the second reference image that satisfies the second extraction condition before the change to the second reference image that satisfies the second extraction condition after the change.

Figure 15:
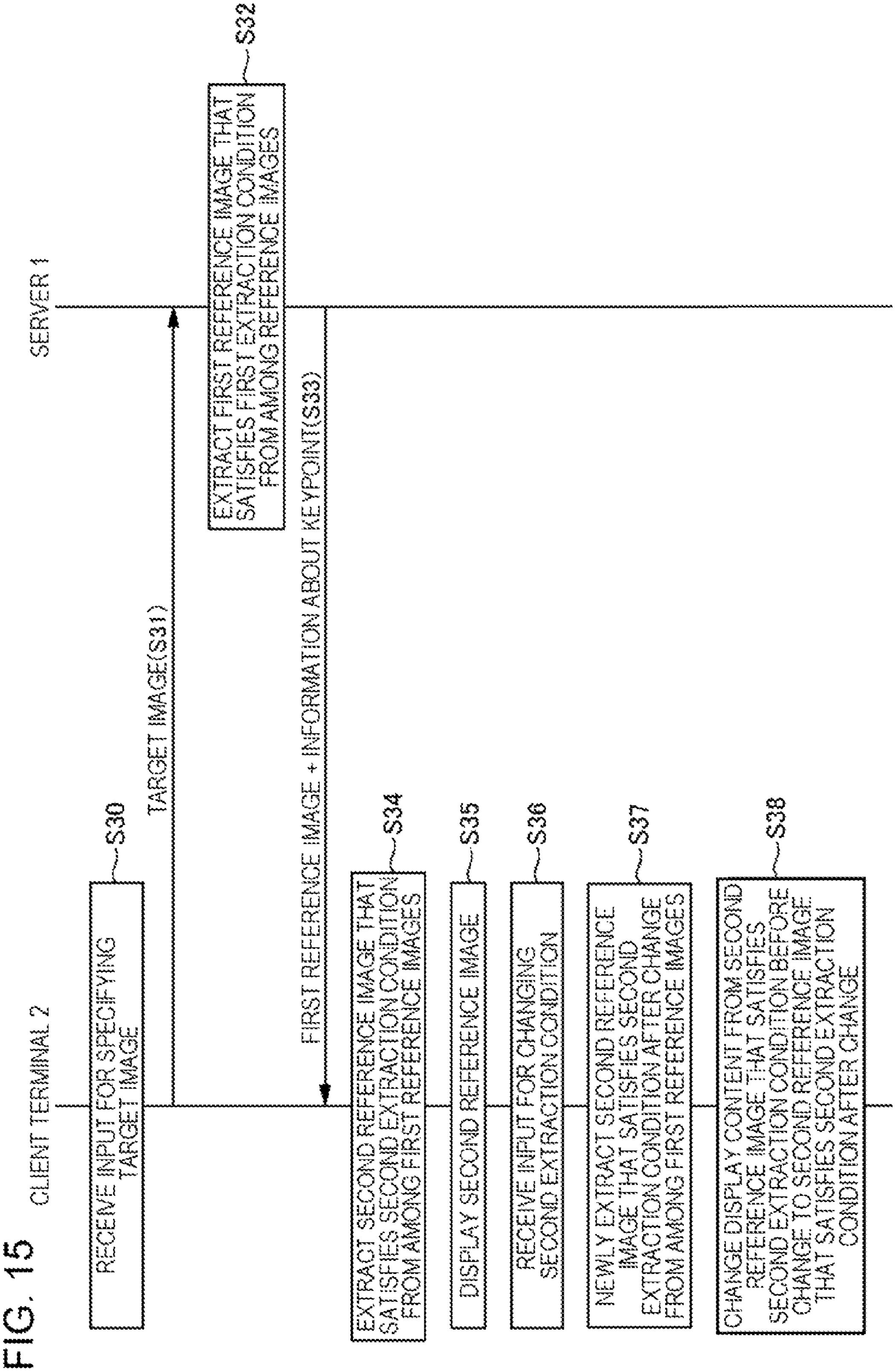
FIG. 15 is a sequence diagram illustrating one example of a flow of processing of the image processing system.

Next, one example of a flow of processing of the image processing system 10 formed of the server 1 and the client terminal 2 will be described by using a sequence diagram in FIG. 15. In the processing example, the server 1 includes the first verification unit 13, and the client terminal 2 includes the second verification unit 14.

First, the client terminal 2 receives a user input for specifying a target image (S30). Next, the client terminal 2 transmits the specified target image to the server 1 (S31).

The server 1 performs processing of detecting a keypoint of a human body included in the target image, and then extracts a first reference image whose relationship with the target image satisfies a first extraction condition from among a plurality of reference images, based on the detected keypoint (S32). Next, the server 1 transmits, to the client terminal 2, the first reference image, information (for example: a feature value, and the like) about a keypoint of a human body detected from each first reference image (see FIG. 11), and information (for example: a feature value, and the like) about a keypoint of a human body detected from the target image (S33).

The client terminal 2 stores the data (image and information) received in S33 in the storage apparatus of the client terminal 2, and extracts a second reference image whose relationship with the target image specified in S30 satisfies a second extraction condition from among the first reference images received in S33 (S34). Then, the client terminal 2 displays the extracted second reference image (S35). The display is achieved by display on a display, projection of a video using a projection apparatus, and the like.

Subsequently, a user performs an input for changing the second extraction condition while referring to a search result (second reference image) displayed on the client terminal 2. The client terminal 2 receives the input for changing the second extraction condition (S36). Then, in response to the reception of the input, the client terminal 2 newly extracts a second reference image whose relationship with the target image specified in S30 satisfies the second extraction condition after the change from among the first reference images received in S33 (S37). Note that, the client terminal 2 performs the extraction processing in S37, based on the data received in S33 and stored in the storage apparatus of the client terminal 2. Next, the client terminal 2 changes a content to be displayed on the display apparatus from the second reference image that satisfies the second extraction condition before the change to the second reference image that satisfies the second extraction condition after the change (S38).

The client terminal 2 can repeatedly perform the processing in S36 to S38.

Figure 16:
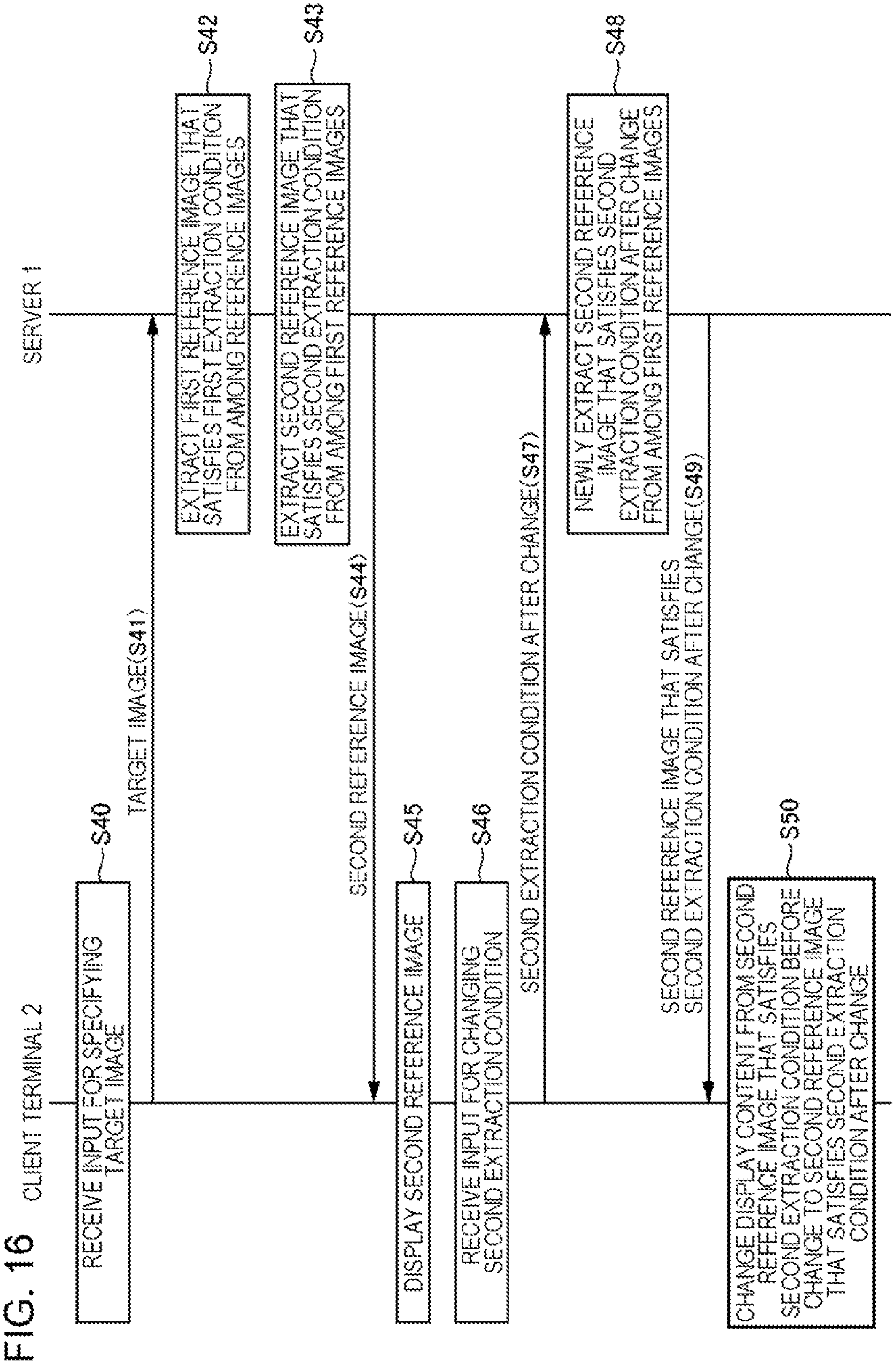
FIG. 16 is a sequence diagram illustrating one example of a flow of processing of the image processing system.

Next, another example of a flow of processing of the image processing system 10 formed of the server 1 and the client terminal 2 will be described by using a sequence diagram in FIG. 16. In the processing example, the server 1 includes the first verification unit 13 and the second verification unit 14.

First, the client terminal 2 receives a user input for specifying a target image (S40). Next, the client terminal 2 transmits the specified target image to the server 1 (S41).

The server 1 performs processing of detecting a keypoint of a human body included in the target image, and then extracts a first reference image whose relationship with the target image satisfies a first extraction condition from among a plurality of reference images, based on the detected keypoint (S42). Then, the server 1 stores the data (image and information) acquired in the processing in S42 in the storage apparatus of the own apparatus.

Next, the server 1 extracts a second reference image whose relationship with the target image received in S41 satisfies a second extraction condition from among the first reference images extracted in S42, based on the detection result of the keypoint in S42 (S43). Then, the server 1 transmits the extracted second reference image to the client terminal 2 (S44).

The client terminal 2 displays the received second reference image (S45). The display is achieved by display on a display, projection of a video using a projection apparatus, and the like.

Subsequently, a user performs an input for changing the second extraction condition while referring to a search result (second reference image) displayed on the client terminal 2. The client terminal 2 receives the input for changing the second extraction condition (S46). Then, the client terminal 2 transmits the second extraction condition after the change to the server 1 (S47).

Next, the server 1 newly extracts a second reference image whose relationship with the target image specified in S40 satisfies the second extraction condition after the change from among the first reference images extracted in S42 (S48). Note that, the server 1 performs the extraction processing in S48, based on the data acquired in the processing in S42 and stored in the storage apparatus of the own apparatus. Next, the server 1 transmits the second reference image that satisfies the second extraction condition after the change to the client terminal 2 (S49).

Then, the client terminal 2 changes a content to be displayed on the display apparatus from the second reference image that satisfies the second extraction condition before the change to the second reference image that satisfies the second extraction condition after the change (S50).

The server 1 and the client terminal 2 can repeatedly perform the processing in S46 to S50.

Figure 17:
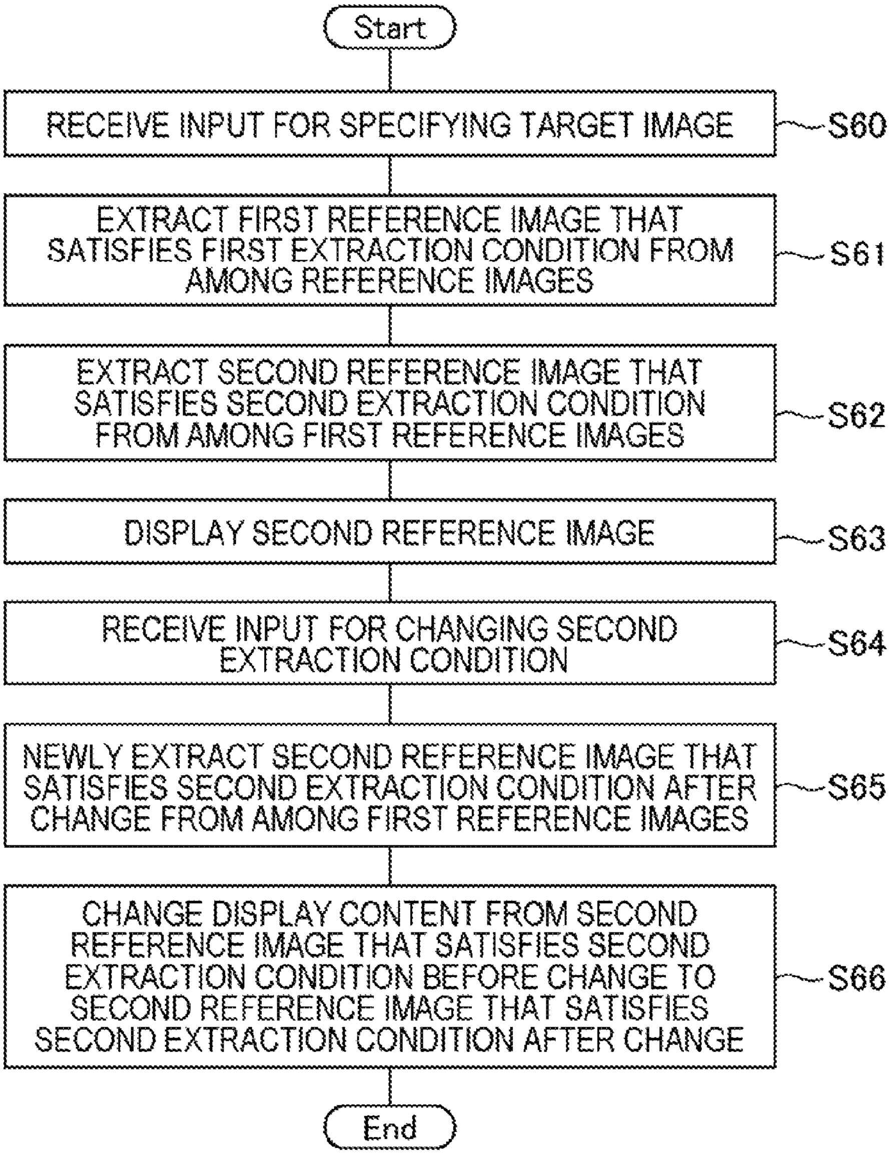
FIG. 17 is a flowchart illustrating one example of a flow of processing of the image processing system.

Next, another example of a flow of processing of the image processing system 10 formed of one apparatus physically and/or logically will be described by using a flowchart in FIG. 17.

First, the image processing system 10 receives a user input for specifying a target image (S60). Next, the image processing system 10 performs processing of detecting a keypoint of a human body included in the target image, and then extracts a first reference image whose relationship with the target image satisfies a first extraction condition from among a plurality of reference images, based on the detected keypoint (S61). Then, the image processing system 10 stores the data (image and information) acquired in the processing in S61 in the storage apparatus of the own apparatus.

Next, the image processing system 10 extracts a second reference image whose relationship with the target image specified in S60 satisfies a second extraction condition from among the first reference images extracted in S61, based on the detection result of the keypoint in S61 (S62). Then, the image processing system 10 displays the extracted second reference image (S63). The display is achieved by display on a display, projection of a video using a projection apparatus, and the like.

Subsequently, a user performs an input for changing the second extraction condition while referring to a search result (second reference image) displayed on the image processing system 10. The image processing system 10 receives the input for changing the second extraction condition (S64).

Next, the image processing system 10 newly extracts a second reference image whose relationship with the target image specified in S60 satisfies the second extraction condition after the change from among the first reference images extracted in S61 (S65). Note that, the image processing system 10 performs the extraction processing in S65, based on the data acquired in the processing in S61 and stored in the storage apparatus of the own apparatus. Next, the image processing system 10 changes a content to be displayed on the display apparatus from the second reference image that satisfies the second extraction condition before the change to the second reference image that satisfies the second extraction condition after the change (S66).

The image processing system 10 can repeatedly perform the processing in S64 to S66.

Another configuration of the image processing system 10 according to the present example embodiment is similar to the configuration of the image processing system 10 according to the first to fourth example embodiments. The image processing system 10 according to the present example embodiment also achieves an advantageous effect similar to that of the image processing system 10 according to the first to fourth example embodiments.

Further, the image processing system 10 according to the present example embodiment can increase a speed of search processing in work for repeatedly performing the search processing and changing a second extraction condition while confirming a search result of the search processing.

Sixth Example Embodiment

An image processing system 10 according to the present example embodiment receives a change in a second extraction condition via a characteristic user interface (UI) screen. Details will be described below.

FIG. 14 illustrates one example of a functional block diagram of the image processing system 10. As illustrated, the image processing system 10 includes a target image acquisition unit 11, a skeleton structure detection unit 12, a first verification unit 13, a second verification unit 14, a display control unit 15, and a change reception unit 16.

The change reception unit 16 receives an input for changing a second extraction condition via a characteristic setting screen (UI screen). When the image processing system 10 is formed of a server 1 and a client terminal 2 as in the second and third example embodiments, the client terminal 2 displays the setting screen. Further, when the image processing system 10 is formed of one apparatus physically and/or logically as in the fourth example embodiment, the one apparatus displays the setting screen.

Figure 18:
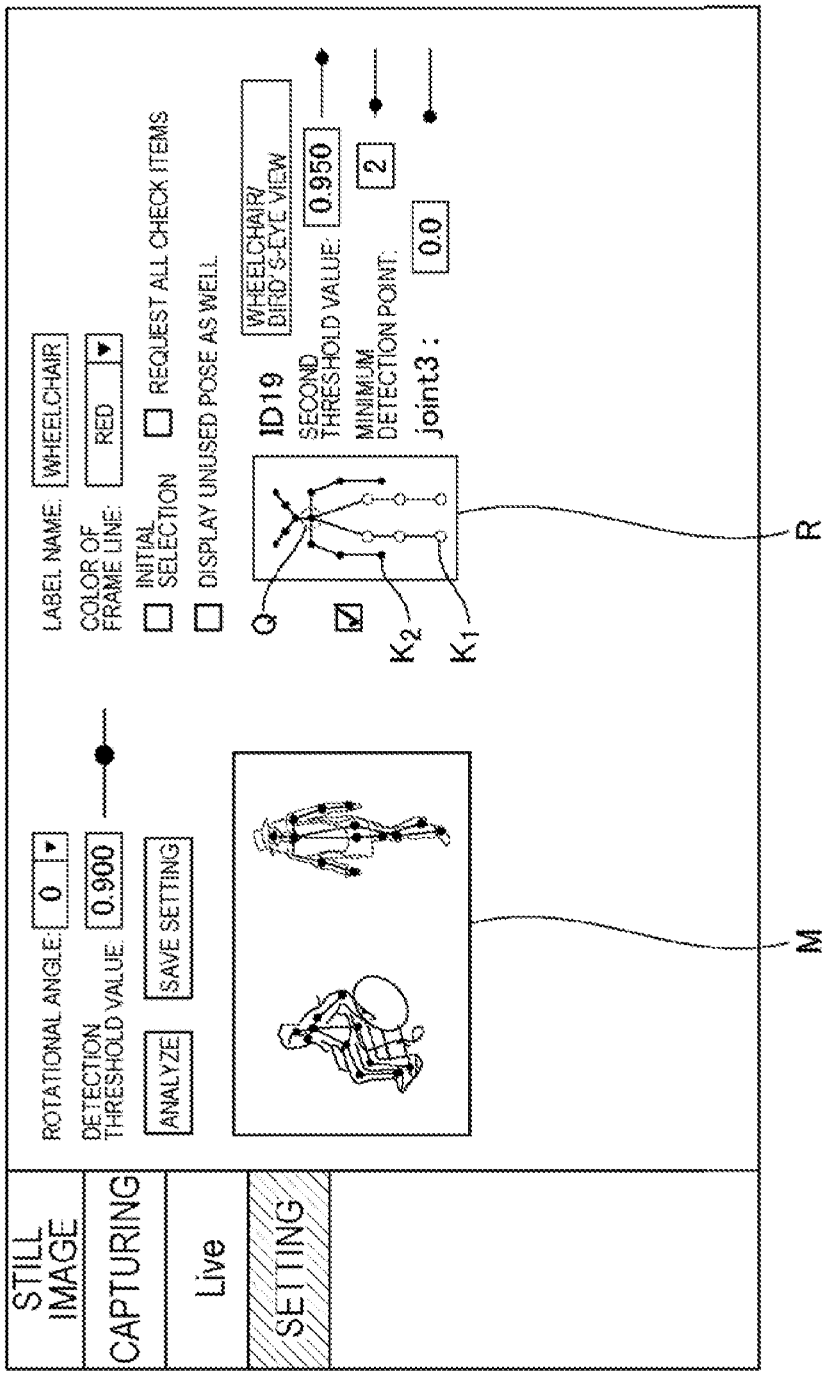
FIG. 18 is a diagram illustrating one example of a setting screen provided by the image processing system.

FIG. 18 illustrates one example of the setting screen. In the illustrated UI screen, items of "still image", "capturing", "Live", and "setting" are selectable in a region on a left end. The setting screen as illustrated is displayed by selecting "setting" in the region.

In the illustrated setting screen, a moving image is reproduced and displayed in a region M. The moving image may be a live image being currently captured by any camera, or may be a moving image being captured in the past and stored.

"Rotational angle" is a UI part for rotating an image in the region M. For example, 0 degree, 90 degrees, 180 degrees, and 270 degrees are selectable, and an image displayed in the region M is rotated by a selected angle. For example, when "90 degrees" is selected in the illustrated state, an image displayed in the region M is rotated clockwise by 90 degrees.

"Detection threshold value" is a first reference value of a first extraction condition.

"Label name" is as described in the second example embodiment. A user can select a label name via the UI part.

"Color of frame line", "initial selection", "select all check items", and "display unused pose as well" will be described below.

The UI part for receiving an input for changing a second extraction condition is displayed under the region in which the items described above are displayed. In response to selection of a label name, a current setting content in response to one or each of a plurality of data names being associated with a group of the label name is displayed. A user can change the setting content to a desired content. For example, when a user selects "wheelchair" as a label name as illustrated, a current setting content in response to "wheelchair: bird's-eye view" being a data name associated with a group of the label name is displayed. Further, although not illustrated, for example, when a user selects "use of cellular phone" as a label name, a current setting content in response to each of data names such as "cellular phone/right hand/bird's-eye view" and "cellular phone/left hand/bird's-eye view" being associated with a group of the label name is displayed. In other words, in response to each of data names such as "cellular phone/right hand/bird's-eye view" and "cellular phone/left hand/bird's-eye view", a human model, a second threshold value, a minimum detection point, and the like as illustrated are displayed.

A human model formed of N keypoints is displayed in a region R. Then, a keypoint being referred when a degree of similarity of a pose of a human body is computed and a keypoint not being referred are displayed in an identifiable manner. In a case of the illustrated example, a keypoint $K_1$ indicated by a white dot is referred when a degree of similarity of a pose of a human body is computed, and a keypoint $K_2$ indicated by a black dot is not referred when a degree of similarity of a pose of a human body is computed.

A user can select one from among the N keypoints, and change a weight of the keypoint. In a case of the illustrated example, a keypoint surrounded by a mark Q is selected by the user. A name of the keypoint is "joint3". In response to selection of the one keypoint, as illustrated, a name of the selected keypoint and the UI part that changes a weight thereof are displayed. In a case of the illustrated example, the weight of joint3 is "0.0". This indicates that the keypoint is not referred when a degree of similarity of a pose of a human body is computed.

The user can change a weight of the selected keypoint by an operation of an illustrated slide bar, a direct input of a numerical value, or the like, for example. For example, the weight of joint3 can be changed from "0" to a "numerical value different from 0". Then, in response to the change, joint3 is switched from the keypoint not being referred when a degree of similarity of a pose of a human body is computed to a keypoint being referred. In response to this, a display of joint3 in the region R is switched from the black dot to the white dot.

Note that, a keypoint (keypoint $K_1$ indicated by the white dot) being referred when a degree of similarity of a pose of a human body is computed can be selected, and a weight of the keypoint can be changed to "0". In response to the change, the keypoint is switched from the keypoint being referred when a degree of similarity of a pose of a human body is computed to a keypoint not being referred. In response to this, a display of the keypoint in the region R is switched from the white dot to the black dot.

In addition, a keypoint (keypoint $K_1$ indicated by the white dot) being referred when a degree of similarity of a pose of a human body is computed can be selected, and a weight of the keypoint can be changed within a range from "0".

"ID19: wheelchair/bird's-eye view" is "data name" described in the second example embodiment. In the present example embodiment, a second extraction condition is set for each data name. By referring to a display of a data name such as "ID19: wheelchair/bird's-eye view", the user can recognize the second extraction condition in response to which data name is being displayed and set.

"Second threshold value" is a second reference value of the second extraction condition.

"Minimum detection point" is as described in the fifth example embodiment. In a case of the example, the second extraction condition includes a condition that a "predetermined number or more of keypoints being referred when a degree of similarity of a pose of a human body is computed is detected". In a case of the illustrated example, six keypoints (keypoint $K_1$ indicated by the white dot) are "keypoints being referred when a degree of similarity of a pose of a human body is computed", and a minimum detection point is "2". In this case, detection of two or more of the six keypoints is a condition for satisfying the second extraction condition.

The change reception unit 16 can receive an input including a human model (human model displayed in the region R) formed of such a plurality of keypoints and being performed for selecting a keypoint being a setting target on the human mode, and can receive an input for changing the second extraction condition via the setting screen that receives an input for changing a weight of the selected keypoint (keypoint surrounded by the mark Q).

Further, the change reception unit 16 can receive the input for changing the second extraction condition via the setting screen that emphasizes and displays the selected keypoint (emphasizes and displays the mark Q) in the human model described above.

Further, the change reception unit 16 can receive the input for changing the second extraction condition via the setting screen that displays, in different manners, a keypoint (keypoint $K_1$ indicated by the white dot) whose set weight is greater than a threshold value (for example: 0) and the other keypoint (keypoint $K_2$ indicated by the black dot) in the human model described above.

Note that, when a "save setting" button on an upper left of the screen in FIG. 18 is pressed, a setting content at that point in time is saved. A saving target is the second extraction condition, but a first reference value of the first extraction condition may also be a saving target by the operation.

Figure 19:
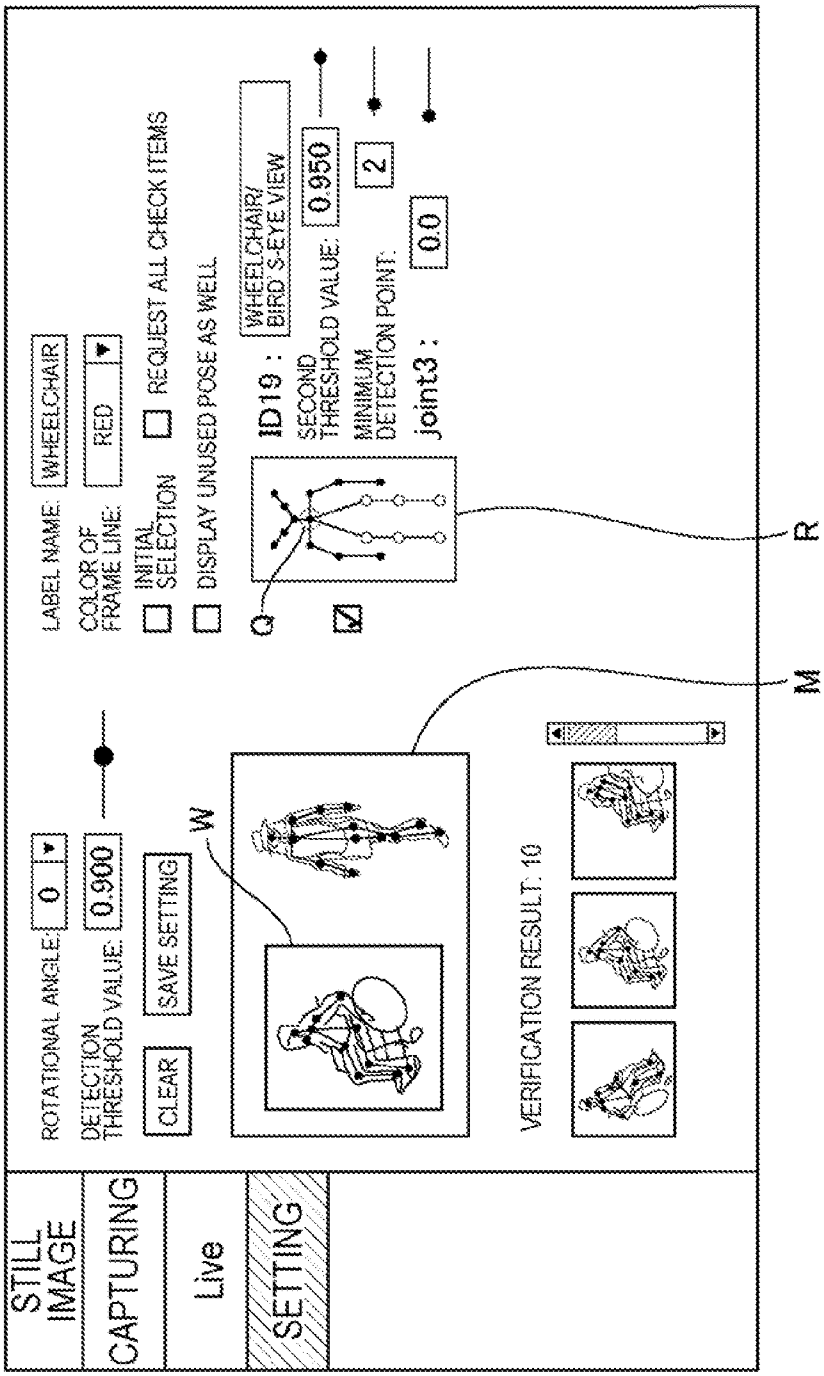
FIG. 19 is a diagram illustrating one example of a setting screen provided by the image processing system.

When an "analyze" button on the upper left of the screen is pressed, the target image acquisition unit 11 acquires, as a target image, a frame image displayed in the region M at that point in time. Subsequently, the skeleton structure detection unit 12, the first verification unit 13, and the second verification unit 14 perform the processing described in the first to fifth example embodiments on the target image. Then, as illustrated in FIG. 19, the display control unit 15 displays a second reference image extracted by the second verification unit 14. 10 images displayed in a column of "verification result" in the drawing are second reference images extracted by the second verification unit 14.

Note that, as illustrated, the display control unit 15 can switch an image displayed in the region M from an original moving image to a specified target image (still image) in response to a specification (pressing of the "analyze" button on the upper left of the screen in FIG. 18) of a target image. Then, the display control unit 15 can superimpose and display a frame W on the target image. The frame W is displayed in such a way as to surround a "person who satisfies a second extraction condition in response to a data name being associated with a group of a selected label name" being detected in the target image. "Color of frame line" that can be set in the screen is a color of the frame W.

The display control unit 15 may further superimpose and display, on the target image, a keypoint of a human body detected in the target image. The superimposition and the display are achieved based on a detection result by the skeleton structure detection unit 12. Note that, in the superimposition and the display, all keypoints may be displayed in the same display manner, or may be displayed in different display manners. For example, a keypoint of a right side of a body and a keypoint of a left side of the body may be displayed in display manners different from each other, or a keypoint of an upper half of the body and a keypoint of a lower half of the body may be displayed in display manners different from each other. Further, a keypoint being referred when a degree of similarity of a pose of a human body is computed may be emphasized and displayed. Furthermore, when one keypoint is selected in the region R, the selected keypoint may be emphasized and displayed in a human model superimposed and displayed on the target image.

Figure 20:
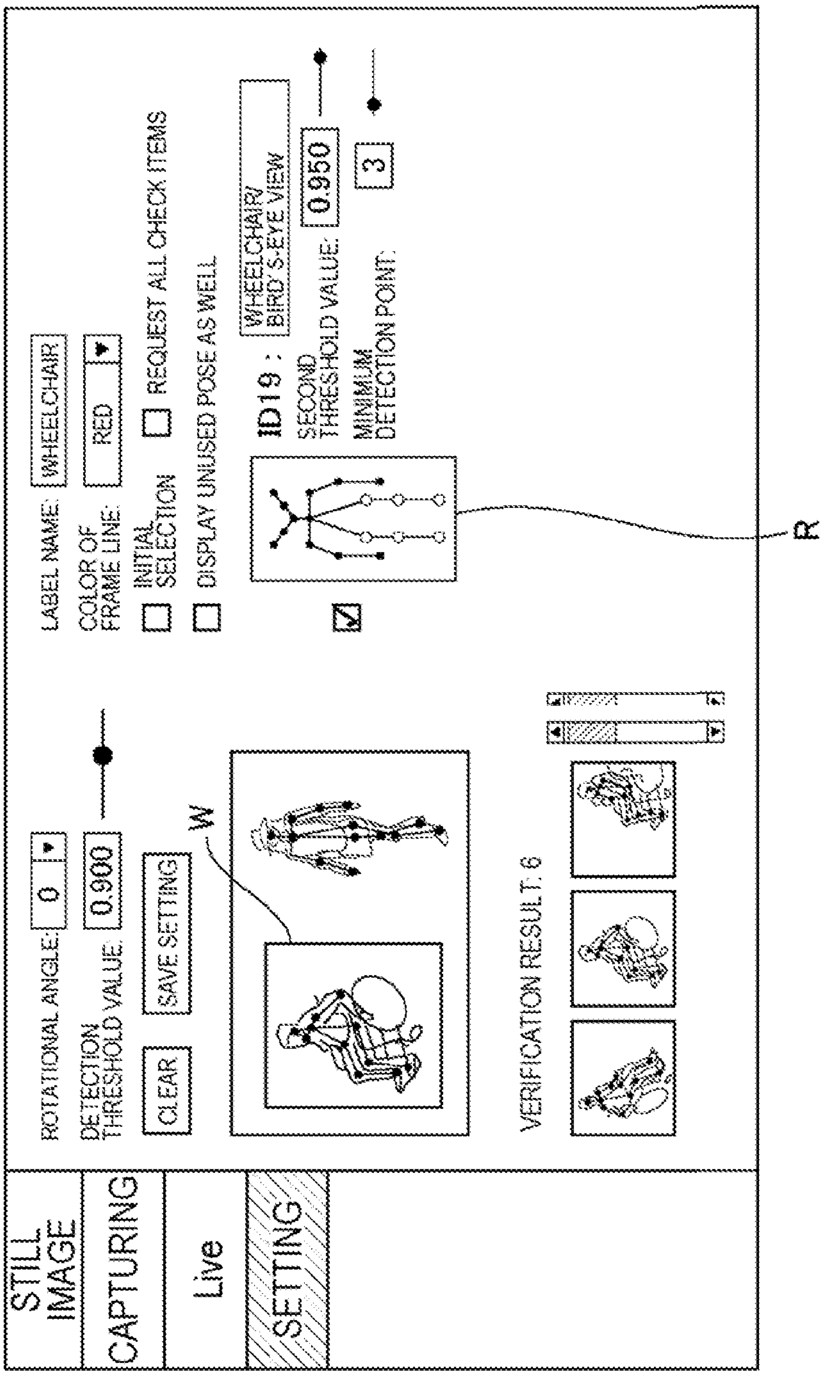
FIG. 20 is a diagram illustrating one example of a setting screen provided by the image processing system.

The user can perform the input for changing the second extraction condition while referring to the verification result. For example, it is assumed that the user changes the minimum detection point from the state in FIG. 19 to "3". Then, in response to the change in the second extraction condition, the second verification unit 14 newly extracts a second reference image whose relationship with the target image satisfies the second extraction condition after the change from among first reference images. Then, as illustrated in FIG. 20, the display control unit 15 changes a content to be displayed in the column of the verification result from the second reference image that satisfies the second extraction condition before the change to the second reference image that satisfies the second extraction condition after the change. FIGS. 19 and 20 illustrate a scene in which the number of the second reference images to be extracted is changed from 10 to 6 by changing the minimum detection point from 2 to 3.

Figure 21:
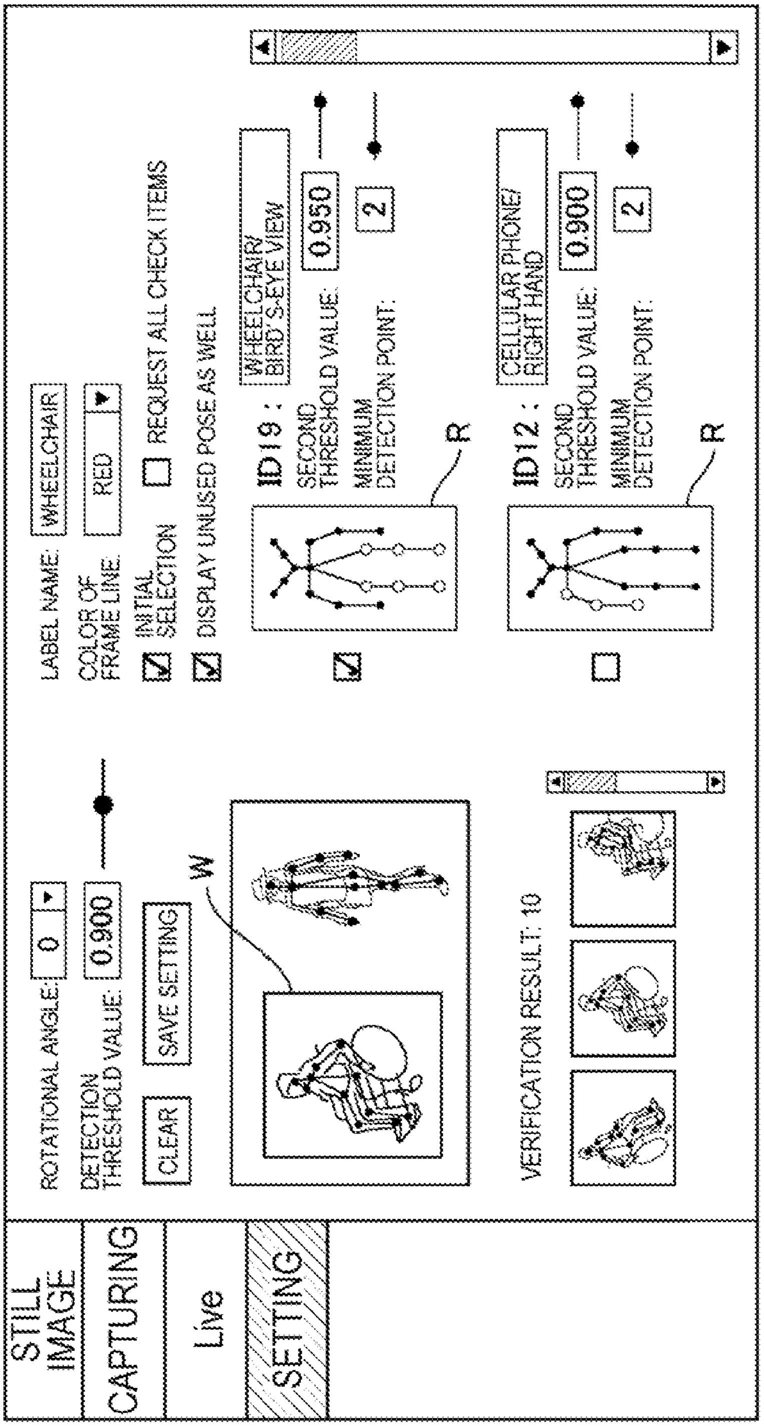
FIG. 21 is a diagram illustrating one example of a setting screen provided by the image processing system.

When a check is placed in "display unused pose as well" as illustrated in FIG. 21, a second extraction condition (having a setting being saved) in response to a data name being associated with a group of a label name other than the selected label name is simultaneously displayed. In FIG. 21, "wheelchair" is selected in "label name", but a check is placed in "display unused pose as well", and thus a second extraction condition in response to a data name not being associated with a group of the selected label name such as "cellular phone/right hand" is also displayed.

Figure 22:
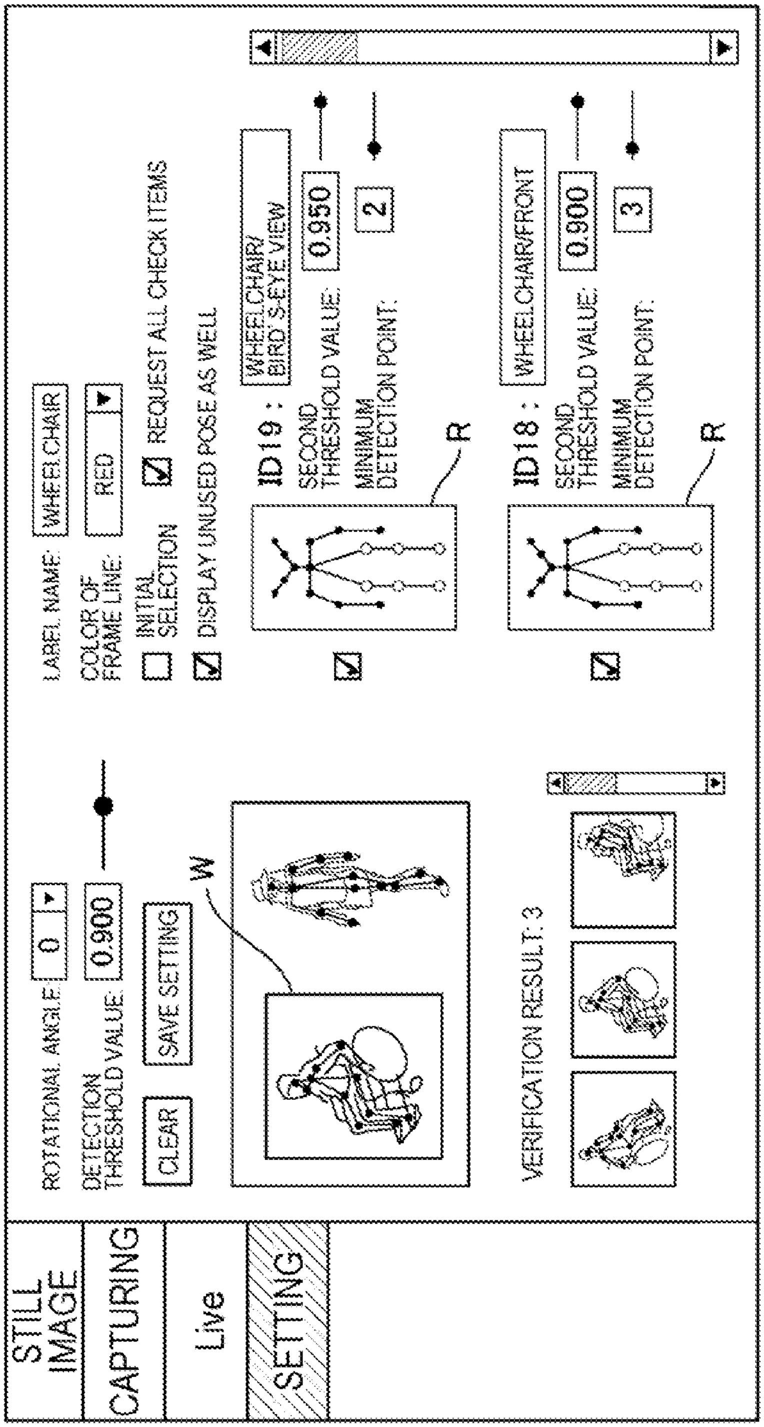
FIG. 22 is a diagram illustrating one example of a setting screen provided by the image processing system.

As illustrated in FIG. 22, the user can specify whether each of a plurality of second extraction conditions in response to each of a plurality of data names is referred in extraction processing of a second reference image by the second verification unit 14. In FIG. 22, a check box (check box adjacent to each region R) in response to each of the plurality of second extraction conditions being associated with each of the plurality of data names is displayed. By individually operating the plurality of check boxes, and placing a check in "request all check items", all the second extraction conditions with the check placed in the check boxes are referred in the extraction processing of a second reference image by the second verification unit 14. Then, the second verification unit 14 extracts a second reference image that satisfies all the second extraction conditions with the check placed in the check box. Note that, when a check is not placed in "request all check items", the second verification unit 14 extracts a second reference image that satisfies at least one of the second extraction conditions with the check placed in the check boxes.

Herein, processing performed when the items of "still image", "capturing", "Live", and "setting" are selected in the region on the left end in the UI screen in FIGS. 18 to 22 will be briefly described.

When "still image" is selected, a screen for selecting a processing image from among images stored in a storage apparatus is displayed. When one image is selected as the processing image, the skeleton structure detection unit 12, the first verification unit 13, and the second verification unit 14 perform the processing described in the first to fifth example embodiments on the processing image. Note that, the first verification unit 13 and the second verification unit 14 extract a first reference image and a second reference image, based on a setting content of a first extraction condition and a second extraction condition at that point in time. Then, the extracted second reference image is displayed as a verification result on the screen.

When "capturing" is selected, a screen for selecting a processing image from a live image being currently captured by any camera or a moving image being captured in the past is displayed. A live image, or a moving image being captured in the past is reproduced and displayed in the screen. Then, a user performs a capturing operation at any timing during the reproduction. Then, a frame image displayed at that timing is selected as the processing image. When one image is selected as the processing image, the skeleton structure detection unit 12, the first verification unit 13, and the second verification unit 14 perform the processing described in the first to fifth example embodiments on the processing image. Note that, the first verification unit 13 and the second verification unit 14 extract a first reference image and a second reference image, based on a setting content of a first extraction condition and a second extraction condition at that point in time. Then, the extracted second reference image is displayed as a verification result on the screen.

When "Live" is selected, a screen for selecting a processing image from a live image being currently captured by any camera or a moving image being captured in the past is displayed. A live image, or a moving image being captured in the past is reproduced and displayed in the screen. Then, a user performs an input for specifying a time interval for selecting the processing image. Then, a plurality of frame images are selected as the processing images at the specified time interval. The skeleton structure detection unit 12, the first verification unit 13, and the second verification unit 14 successively perform the processing described in the first to fifth example embodiments on each of the plurality of selected processing images. Note that, the first verification unit 13 and the second verification unit 14 extract a first reference image and a second reference image, based on a setting content of a first extraction condition and a second extraction condition at that point in time. Then, the extracted second reference image is displayed as a verification result on the screen.

Note that, when any item of "still image", "capturing", and "Live" is selected, a user also selects at least one label name. For example, a check box associated with each of a plurality of label names is displayed on the screen. The user selects at least one label name by placing a check in the check box of a desired label name. Then, the image processing system performs the extraction processing using a second extraction condition (having a setting being saved) in response to a data name being associated with a group of the selected label name, and displays an extracted second reference image as a verification result on the screen.

Herein, "initial selection" in the setting screen (see FIGS. 18 to 22) described above will be described. When a setting is saved while one label name is selected on the setting screen and a check is placed in the initial selection, the label name in the selected state is set as default in the UI part of selection of the label name described above in the screen of "still image", "capturing", and "Live" described above. For example, as illustrated in FIG. 21, when a setting is saved while "wheelchair" is selected as a label name in the setting screen and a check is placed in the initial selection, the label name "wheelchair" in the selected state is set as default in the UI part of selection of the label name described above in the screen of "still image", "capturing", and "Live" described above.

Another configuration of the image processing system 10 according to the present example embodiment is similar to the configuration of the image processing system 10 according to the first to fifth example embodiments. The image processing system 10 according to the present example embodiment also achieves an advantageous effect similar to that of the image processing system 10 according to the first to fifth example embodiments.

Further, the image processing system 10 according to the present example embodiment can perform an input for changing a second extraction condition via the characteristic setting screen described above. A user can efficiently and more accurately set a desired second extraction condition by performing the input for changing the second extraction condition via the characteristic setting screen described above.

While the example embodiments of the present invention have been described with reference to the drawings, the example embodiments are only exemplification of the present invention, and various configurations other than the above-described example embodiments can also be employed. The configurations of the example embodiments described above may be combined together, or a part of the configuration may be replaced with another configuration. Further, various modifications may be made in the configurations of the example embodiments described above without departing from the scope of the present invention. Further, the configurations and the processing disclosed in each of the example embodiments and the modification examples described above may be combined together.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiments may also be described in supplementary notes below, which is not limited thereto.

1. An image processing system including:
   - a target image acquisition unit that acquires a target image;
   - a skeleton structure detection unit that performs processing of detecting a keypoint of a human body included in the target image;
   - a first verification unit that extracts a first reference image whose relationship with the target image satisfies a first extraction condition, from among a plurality of reference images, based on the detected keypoint; and
   - a second verification unit that extracts a second reference image whose relationship with the target image satisfies a second extraction condition, from among the first reference images, based on the detected keypoint.

2. The image processing system according to supplementary note 1, wherein
the first extraction condition is a condition that a degree of similarity, computed by a first computation method, of a pose of a human body included in an image is equal to or more than a first reference value, and
the second extraction condition is a condition that a degree of similarity, computed by a second computation method, of a pose of a human body included in an image is equal to or more than a second reference value.

3. The image processing system according to supplementary note 2, wherein,
in the first computation method and the second computation method, at least one of a number of the keypoints and a kind of the keypoint being referred when a degree of similarity of a pose of a human body is computed is different from each other.

4. The image processing system according to supplementary note 3, wherein
the second extraction condition includes at least one of conditions that
a predetermined number or more of the keypoints being referred when a degree of similarity of a pose of a human body is computed is detected, and
the keypoint being predetermined of the keypoints being referred when a degree of similarity of a pose of a human body is computed is detected.

5. The image processing system according to any of supplementary notes 2 to 4, wherein,
in the first computation method and the second computation method, setting contents of a weight of each of the keypoints being referred when a degree of similarity of a pose of a human body is computed are different from each other.

6. The image processing system according to supplementary note 5, wherein,
in the first computation method, a degree of similarity of a pose of a human body is computed by setting a same weight of all the keypoints, and,
in the second computation method, a degree of similarity of a pose of a human body is computed based on a weight being set for each keypoint.

7. The image processing system according to any of supplementary notes 1 to 6, further including:
a display control unit that displays the second reference image on a display apparatus; and
a change reception unit that receives an input for changing the second extraction condition, wherein,
in response to reception of an input for changing the second extraction condition,
the second verification unit newly extracts the second reference image whose relationship with the target image satisfies the second extraction condition after a change, from among the first reference images, and
the display control unit changes a content to be displayed on the display apparatus from the second reference image that satisfies the second extraction condition before a change to the second reference image that satisfies the second extraction condition after a change.

8. The image processing system according to supplementary note 7, wherein
the change reception unit receives an input including a human model formed of a plurality of the keypoints and being performed for selecting the keypoint being a setting target on the human model, and receives an input for changing the second extraction condition via a setting screen that receives an input for changing a weight of the selected keypoint.

9. The image processing system according to supplementary note 8, wherein
the change reception unit receives an input for changing the second extraction condition via the setting screen that emphasizes and displays the selected keypoint in the human model.

10. The image processing system according to supplementary note 8, wherein
the change reception unit receives an input for changing the second extraction condition via the setting screen that displays, in different manners, the keypoint whose set weight is greater than a threshold value and the other keypoint in the human model.

11. The image processing system according to supplementary note 1, further including:
a server; and a client terminal, wherein
the server includes the first verification unit, and transmits the extracted first reference image to the client terminal, and
the client terminal includes the second verification unit, and extracts the second reference image from among the first reference images received from the server.

12. An apparatus including:
a target image acquisition unit that acquires a target image;
a skeleton structure detection unit that performs processing of detecting a keypoint of a human body included in the target image;
a first verification unit that extracts a first reference image whose relationship with the target image satisfies a first extraction condition, from among a plurality of reference images, based on the detected keypoint; and
a second verification unit that extracts a second reference image whose relationship with the target image satisfies a second extraction condition, from among the first reference images, based on the detected keypoint.

13. A processing method including,
by one or a plurality of computers:
acquiring a target image;
performing processing of detecting a keypoint of a human body included in the target image;
extracting a first reference image whose relationship with the target image satisfies a first extraction condition, from among a plurality of reference images, based on the detected keypoint; and
extracting a second reference image whose relationship with the target image satisfies a second extraction condition, from among the first reference images, based on the detected keypoint.

14. A program causing a computer to function as:
a target image acquisition unit that acquires a target image;
a skeleton structure detection unit that performs processing of detecting a keypoint of a human body included in the target image;

a first verification unit that extracts a first reference image whose relationship with the target image satisfies a first extraction condition, from among a plurality of reference images, based on the detected keypoint; and a second verification unit that extracts a second reference image whose relationship with the target image satisfies a second extraction condition, from among the first reference images, based on the detected keypoint.

1 Server
2 Client terminal
10 Image processing system
11 Target image acquisition unit
12 Skeleton structure detection unit
13 First verification unit
14 Second verification unit
15 Display control unit
16 Change reception unit
1A Processor
2A Memory
3A Input/output I/F
4A Peripheral circuit
5A Bus

The invention claimed is:

1. An image processing system comprising:

at least one memory configured to store one or more instructions; and at least one processor configured to execute the one or more instructions to:

acquire a target image;

perform processing of detecting a plurality of keypoints of a human body included in the target image;

extract a first set of reference images whose relationship with the target image satisfies a first extraction condition, from among a plurality of reference images, based on the detected keypoints;

receive a first input for changing a second extraction condition;

extract a second reference image whose relationship with the target image satisfies the second extraction condition, from among the first set of reference images, based on the detected keypoints;

display the second reference image on a display apparatus;

receive a second input for changing the second extraction condition;

newly extract, in response to reception of the second input for changing the second extraction condition, the second reference image whose relationship with the target image satisfies the second extraction condition after a change, from among the first set of reference images;

change a content to be displayed on the display apparatus from the second reference image that satisfies the second extraction condition before a change to the second reference image that satisfies the second extraction condition after a change;

receive a keypoint selection input for selecting, on a human model formed of a plurality of the detected keypoints, one of the detected keypoints as a setting target;

receive a weight selection input for changing a weight of the selected keypoint via a setting screen; and receive an input for changing the second extraction condition via the setting screen that displays, in different manners:

a keypoint of the human model whose set weight is greater than a threshold value; and other keypoints of the human model.

2. The image processing system according to claim 1, wherein the first extraction condition is a condition that a degree of similarity, computed by a first computation method, of a pose of a human body included in an image is equal to or more than a first reference value, and the second extraction condition is a condition that a degree of similarity, computed by a second computation method, of a pose of a human body included in an image is equal to or more than a second reference value.

3. The image processing system according to claim 2, wherein, the first computation method computes a first degree of similarity of a pose of a human body based on the detected keypoints, the second computation method computes a second degree of similarity of a pose of a human body based on the detected keypoints, and wherein the first computation method and the second computation method differ from each other in that:

a number of the detected keypoints referred to for computing the first degree of similarity and the second degree of similarity is different, a kind of the detected keypoints referred to for computing the first degree of similarity and the second degree of similarity is different, or both a number and a kind of the detected keypoints referred to for computing the first degree of similarity and the second degree of similarity are different.

4. The image processing system according to claim 3, wherein the second extraction condition includes one or both of:

a condition that a predetermined number of the detected keypoints referred to for computing the second degree of similarity are detected, and a condition that a predetermined keypoint among the detected keypoints referred to for computing the second degree of similarity is detected.

5. The image processing system according to claim 3, wherein, setting contents of a weight of each of the detected keypoints referred to for computing the first degree of similarity and the second degree of similarity are different from each other.

6. The image processing system according to claim 5, wherein, in the first computation method, a degree of similarity of a pose of a human body is computed by setting a same weight of all the detected keypoints, and, in the second computation method, a degree of similarity of a pose of a human body is computed based on a weight being set for each keypoint.

7. The image processing system according to claim 1, wherein the processor is further configured to execute the one or more instructions to receive an input for changing the second extraction condition via the setting screen that emphasizes and displays the selected keypoint in the human model.

8. The image processing system according to claim 1, further comprising:
a server; and a client terminal, wherein
the server extracts the first set of reference images and, transmits the extracted first set of reference images to the client terminal, and
the client terminal extracts the second reference image from among the first set of reference images received from the server.

9. The image processing system according to claim 1, wherein
the image processing system includes a server and a client terminal,
the server
performs processing of detecting the plurality of keypoints of the human body included in the target image,
extracts the first set of reference images whose relationship with the target image satisfies a first extraction condition, and
transmits the extracted first set of reference images to the client terminal, and
the client terminal
extracts the second reference image whose relationship with the target image satisfies the second extraction condition.

10. A processing method comprising,
by one or a plurality of computers:
acquiring a target image;
performing processing of detecting a plurality of keypoints of a human body included in the target image;
extracting a first set of reference images whose relationship with the target image satisfies a first extraction condition, from among a plurality of reference images, based on the detected keypoints;
receiving a first input for changing a second extraction condition;
extracting a second reference image whose relationship with the target image satisfies the second extraction condition, from among the first set of reference images, based on the detected keypoints;
displaying the second reference image on a display apparatus;
receiving a second input for changing the second extraction condition;
newly extracting, in response to reception of the second input for changing the second extraction condition, the second reference image whose relationship with the target image satisfies the second extraction condition after a change, from among the first set of reference images;
changing a content to be displayed on the display apparatus from the second reference image that satisfies the second extraction condition before a change to the second reference image that satisfies the second extraction condition after a change;
receiving a keypoint selection input for selecting, on a human model formed of a plurality of the detected keypoints, one of the detected keypoints as a setting target;
receiving a weight selection input for changing a weight of the selected keypoint via a setting screen; and
receiving an input for changing the second extraction condition via the setting screen that displays, in different manners:
a keypoint of the human model whose set weight is greater than a threshold value; and
other keypoints of the human model.

11. The processing method according to claim 10, wherein
a server
performs the processing of detecting the plurality of keypoints of the human body included in the target image,
extracts the first set of reference images whose relationship with the target image satisfies a first extraction condition, and
transmits the extracted first set of reference images to a client terminal, and
the client terminal
extracts the second reference image whose relationship with the target image satisfies the second extraction condition.

12. A non-transitory storage medium storing a program causing a computer to:
acquire a target image;
perform processing of detecting a plurality of keypoints of a human body included in the target image;
extract a first set of reference images whose relationship with the target image satisfies a first extraction condition, from among a plurality of reference images, based on the detected keypoints;
receive a first input for changing a second extraction condition;
extract a second reference image whose relationship with the target image satisfies the second extraction condition, from among the first set of reference images, based on the detected keypoints;
display the second reference image on a display apparatus;
receive a second input for changing the second extraction condition;
newly extract, in response to reception of the second input for changing the second extraction condition, the second reference image whose relationship with the target image satisfies the second extraction condition after a change, from among the first set of reference images;
change a content to be displayed on the display apparatus from the second reference image that satisfies the second extraction condition before a change to the second reference image that satisfies the second extraction condition after a change;
receive a keypoint selection input for selecting, on a human model formed of a plurality of the detected keypoints, one of the detected keypoints as a setting target;
receive a weight selection input for changing a weight of the selected keypoint via a setting screen; and
receive an input for changing the second extraction condition via the setting screen that displays, in different manners:
a keypoint of the human model whose set weight is greater than a threshold value; and
other keypoints of the human model.

13. The non-transitory storage medium according to claim 12, wherein
the image processing system includes a server and a client terminal,
the server
performs processing of detecting the plurality of keypoints of the human body included in the target image, extracts the first set of reference images whose relationship with the target image satisfies a first extraction condition, and transmits the extracted first set of reference images to the client terminal, and the client terminal extracts the second reference image whose relationship with the target image satisfies the second extraction condition.

* * * * *